United States Patent
Anderson et al.

(10) Patent No.: US 6,386,421 B1
(45) Date of Patent: May 14, 2002

(54) ACTUATION SYSTEM FOR AN INTERNAL BACKUP RING ASSEMBLY

(75) Inventors: Clifford J. Anderson; Brian R. Thicke; Mark R. Sawa, all of Edmonton (CA)

(73) Assignee: Proline Pipe Equipment, Inc., Alberta (CA)

( * ) Notice: Subject to any disclaimer, the term of this patent is extended or adjusted under 35 U.S.C. 154(b) by 0 days.

(21) Appl. No.: 09/875,408

(22) Filed: Jun. 6, 2001

(30) Foreign Application Priority Data

Apr. 5, 2001 (CA) .............................................. 2343285

(51) Int. Cl.[7] .......................................... B23K 37/053
(52) U.S. Cl. ..................... 228/44.5; 228/49.3
(58) Field of Search ................ 228/212, 213, 228/44.3, 44.5, 49.1, 49.3; 269/20, 25, 26

(56) References Cited

U.S. PATENT DOCUMENTS

| | | | |
|---|---|---|---|
| 3,741,457 A | 6/1973 | Gwin et al. | |
| 3,859,938 A | 1/1975 | Fukuyama | |
| 3,937,382 A | 2/1976 | Cunningham et al. | |
| 3,979,041 A | 9/1976 | Kaneyama et al. | |
| 4,144,439 A | * 3/1979 | Chang et al. | |
| 4,165,831 A | 8/1979 | Connell | |
| 4,177,914 A | 12/1979 | Clavin | |
| 4,201,326 A | 5/1980 | Connell | |
| 4,285,458 A | 8/1981 | Slavens | |
| 4,556,162 A | 12/1985 | Gwin et al. | |
| 4,648,544 A | 3/1987 | Puisais et al. | |
| 4,682,724 A | 7/1987 | Hahn | |
| 5,110,031 A | 5/1992 | Rinaldi | |
| 5,356,067 A | 10/1994 | Leduc | |
| 5,471,030 A | 11/1995 | Boula | |
| 5,535,938 A | 7/1996 | Leduc | |
| 5,593,605 A | * 1/1997 | Jones | |
| 5,597,108 A | 1/1997 | Dierlam | |
| 5,624,067 A | 4/1997 | Harwig et al. | |
| 5,664,837 A | 9/1997 | Takagi | |
| 6,119,916 A | * 11/2000 | Anderson et al. | |

FOREIGN PATENT DOCUMENTS

| | | |
|---|---|---|
| CA | 1060488 | 8/1979 |
| CA | 1269825 | 6/1990 |
| CA | 2183156 | 8/1995 |
| DE | 3901022 | 7/1990 |
| EP | 0624425 | 11/1994 |
| GB | 2067945 | 8/1981 |
| JP | 10076394 | 3/1998 |

* cited by examiner

Primary Examiner—Tom Dunn
Assistant Examiner—Kiley Stoner
(74) Attorney, Agent, or Firm—Rodman & Rodman

(57) ABSTRACT

An actuation system for a clamping assembly for use in a pipe clamping apparatus, including a shaft and an actuator defining an actuator chamber having a peripheral chamber wall. The actuator is movably mounted about the shaft such that the shaft extends through the actuator chamber and the actuator is longitudinally reciprocable thereon. A piston is fixedly mounted about the shaft and positioned within the actuator chamber. The piston has first and second sides and an outer perimeter sealingly engaging the peripheral chamber wall to create first and second chambers such that the actuator reciprocates along the shaft in response to a differential force applied within the first and second chambers. The clamping assembly is associated with the actuator such that reciprocation of the actuator along the shaft causes the clamping assembly to move radially relative to a longitudinal axis of the shaft.

32 Claims, 8 Drawing Sheets

ACTUATION SYSTEM FOR AN INTERNAL BACKUP RING ASSEMBLY

FIELD OF INVENTION

The present invention relates to an actuation system for a clamping assembly for use in a pipe clamping apparatus. Further, the present invention relates to an internal clamping assembly for a pipe, preferably a backup ring assembly, and to a pipe clamping apparatus comprised of the clamping assembly.

BACKGROUND OF INVENTION

Typically, a pipeline is constructed of a number of pipe lengths or sections which are placed end to end and welded together at the respective adjacent ends as the construction of the pipeline proceeds. In order to achieve a desirable weld between the adjacent ends, the ends of the pipe sections must be clamped or held in close proximity. For this purpose, various pipe clamping apparatuses have been developed for clamping the pipe sections for welding.

Once the clamping apparatus is in place, the welding is typically performed by a welding device outside of or exterior to the pipe sections. During the welding operation, a weld backup ring is preferably provided on the inside or interior surfaces of the pipe sections at the location of the abutment of the adjacent ends of the pipe sections. The backup ring is desirable for supporting the weld pool which would otherwise fall into the pipe sections during the welding operation. Also, the backup ring facilitates the formation of a relatively smooth circumferential weld internally of the pipeline.

Several conventional clamping apparatuses and associated backup rings are described in United Kingdom Patent Application 2,067,945 published Aug. 5, 1981 by Rinaldi, Canadian Patent Application 2,183,156 published Aug. 17, 1995 by Brookhouse, U.S. Pat. No. 5,535,938 issued Jul. 16, 1996 to Leduc, U.S. Pat. No. 3,979,041 issued Sep. 7, 1976 to Kaneyama, U.S. Pat. No. 4,177,914 issued Dec. 11, 1979 to Clavin, U.S. Pat. No. 4,201,326 issued May 6, 1980 to Connell, U.S. Pat. No. 4,285,458 issued Aug. 25, 1981 to Slavens, U.S. Pat. No. 3,741,451 issued Jun. 26, 1973 to Gwin, U.S. Pat. No. 3,937,382 issued Feb. 10, 1976 to Cunningham and U.S. Pat. No. 5,110,031 issued May 5, 1992 to Rinaldi.

Such conventional clamping apparatuses are typically capable of self-propulsion through the pipeline and include independently operable front and rear clamping mechanisms for clamping the adjacent pipe sections for welding and a backup ring for providing backup support at the weld. More particularly, the front pipe clamping mechanism comprises a plurality of clamping shoes radially movable between a retracted position and an extended position for engaging the interior surface of the front pipe section. The rear pipe clamping mechanism is also comprised of a plurality of clamping shoes radially movable between a retracted position and an extended position for engaging the interior surface of the rear pipe section.

The backup ring is similarly comprised of a plurality of segments movable between a retracted position and an extended position for engaging the interior surface of the front and rear pipes at their adjacent ends. Typically, the backup ring, is mounted with the front and rear pipe clamping mechanisms. For instance, the backup ring may either form part of, or be extendible and retractable simultaneously with, one or both of the front and rear clamping mechanisms of the associated pipe clamping apparatus. However, the backup ring may be also be retractable and extendible independently of the clamping mechanisms.

Each of the above apparatuses tends to have a relatively complicated or complex structure and tends to be relatively large-scaled. As a result, each apparatus tends to be primarily useful in larger diameter pipes. In other words, the structure and size of each of these apparatuses may result in difficulties when attempting to reduce the size of the apparatus for smaller diameter pipes. Accordingly, various attempts have been made to provide a pipe clamping apparatus which may be reduced in size to be particularly useful for medium to smaller diameter pipes, such as those having a diameter of between about 16 inches (40.64 cm) and 32 inches (81.28 cm). However, none of these attempts have been fully satisfactory.

Canadian Patent No. 1,060,488 issued Aug. 14, 1979 to Lajoie et. al. is directed at a pipe clamping apparatus comprised of a longitudinally disposed piston rod having a pneumatic piston fixed at one end thereof which is movable within a stationary cylinder. A plurality of radial elements for engaging the interior surface of the pipe are coupled with the other end of the longitudinal piston rod by a plurality of links or toggles. Specifically, the plurality of links or toggles attach or connect each of the radial elements to the longitudinal piston rod. When the piston is energized, the piston and the piston rod affixed thereto move as a unit longitudinally in a direction towards the links to apply a longitudinal force. The longitudinal force creates a compressive force in the links or toggles connected between the piston rod and the radial elements to move the radial elements radially outwards to engage the pipe surface. When the piston is no longer energized, the piston is biased by a compression spring to return to its initial position to move the radial elements radially inwards to disengage the pipe surface.

Canadian Patent No. 1,269,825 issued Jun. 5, 1990 to Okamoto describes a device for internally clamping pipes comprised of a longitudinally disposed guide bar and a pair of axially spaced apart pressure chambers or cylinders. A piston is fitted movably around the guide bar within each pressure chamber such that the piston is movable along the stationary guide bar within the chamber. A plurality of retractable clamps for engaging the inner surface of the pipe are connected with, and actuated by, each of the pistons by a plurality of actuating links. In other words, the plurality of actuating links attach or connect each of the clamps to one of the pistons. To actuate the device, pressurized fluid is supplied to each pressure chamber which acts upon each piston to move the piston longitudinally along the guide bar within the pressure chamber. Longitudinal movement of the piston along the guide bar causes the actuating links connected with each piston to move the clamps radially outwards for engagement with the pipe surface. Return springs are provided for acting upon each piston to return the piston to its initial position to retract the clamps upon release of the fluid pressure.

U.S. Pat. No. 3,937,382 issued Feb. 10, 1976 to Cunningham also describes a clamping apparatus which includes a first and a second set of clamping members and a weld backup mounted about a central shaft. The mechanism for actuation of the clamping members differs from the mechanism for actuation of the weld backup. Each set of clamp members is actuated by a longitudinally disposed piston rod slidably received upon the central shaft and rigidly coupled with a piston at one end thereof, which piston is movably received within a stationary cylinder. A hub is rigidly affixed to the piston rod. Further, the clamp members are coupled with the hub by a plurality of links or toggles. Specifically, the plurality of links or toggles attach or connect each of the clamp members to the hub which is rigidly affixed to the longitudinal piston rod. When the piston is energized in a first direction, the piston, the piston rod and the hub affixed thereto move as a unit longitudinally in a direction towards the links. Longitudinal movement of the hub along the central shaft causes the links connected between the hub and the clamping members to move the clamping members radially outwards for engagement with the pipe surface. Energization of the piston in an opposed direction moves the piston, the piston rod and the hub as a unit longitudinally in an opposite direction away from the links to move the clamping members radially inwards to disengage the pipe surface.

The weld backup is comprised of a central hub which is rigidly mounted about the central shaft and a ring housing which is rigidly mounted with the central hub. The ring housing defines a plurality of circumferentially spaced cylinders, each having a piston mounted therein for radial movement within the cylinder. Each of the pistons has an end associated with a copper backup shoe. Two-way radial movement of each of the pistons is affected by a flow of fluid into the cylinder accommodating the piston, which results in the extension and retraction of the associated backup shoes.

U.S. Pat. No. 3,979,041 issued Sep. 7, 1976 to Kaneyama, U.S. Pat. No. 5,356,067 issued Oct. 18, 1994 to Leduc and U.S. Pat. No. 5,597,108 issued Jan. 28, 1997 to Dierlam also describe a pipe clamping apparatus comprised of a longitudinally disposed piston rod having a double acting piston fixed at one end thereof, which piston is movable within a stationary cylinder. A hub, ring or body is rigidly affixed with the other end of the movable piston rod. Further, a plurality of backup shoes for engaging the interior surface of the pipe are coupled with the hub, ring or body by a plurality of links or crank arms. Specifically, the plurality of links or crank arms attach or connect each of the backup shoes to the hub, ring or body, which is in turn rigidly affixed with the longitudinally movable piston rod. When the piston is energized in a first direction within the stationary cylinder, the piston, the piston rod and the hub, ring or body move as a unit longitudinally in a direction towards the links or crank arms, which cause the backup shoes to move radially outwards. Energization of the piston within the stationary cylinder in an opposed direction moves the piston, the piston rod and the hub, ring or body as a unit longitudinally in a direction away from the links or crank arms, which cause the backup shoes to move radially inwards.

There remains a need in the industry for an improved internal clamping assembly for a pipe and particularly, for an improved backup ring assembly. The improved internal clamping apparatus and improved backup ring assembly are preferably suitable for use with a pipe having any diameter. However, there further remains a need in the industry for an internal pipe clamping assembly, including a backup ring assembly, which is suitable for use for medium to smaller diameter pipes such as those having a diameter of between about 16 inches (40.64 cm) and 32 inches (81.28 cm). Finally, there is a need for a backup ring assembly having a relatively simple structure and which is relatively easily retrofittable to an existing pipe clamping apparatus.

SUMMARY OF INVENTION

The present invention relates to an actuation system for a pipe clamping assembly for use in an internal pipe clamping apparatus. Further, the present invention relates to an internal clamping assembly for a pipe and to a pipe clamping apparatus comprised of the clamping assembly. Preferably, the clamping assembly is comprised of a backup ring assembly. However, the clamping assembly may also be comprised of a front clamping mechanism or a rear clamping mechanism for a pipe clamping apparatus.

The actuation system for the clamping assembly preferably has a relatively simple structure and is relatively easily retrofittable to an existing pipe clamping apparatus. The pipe clamping apparatus, including the actuation system and the clamping assembly, is suitable for use with a pipe having any diameter. However, the pipe clamping apparatus, including the actuation system and the clamping assembly, is particularly suitable for use for medium to smaller diameter pipes such as those having a diameter of between about 16 inches (40.64 cm) and 32 inches (81.28 cm). In addition, the pipe clamping apparatus preferably permits the operation of the backup ring assembly independently of the front and rear clamping mechanisms.

More particularly, the present invention relates to an actuation system for a clamping assembly for engaging an interior surface of a pipe for use in a pipe clamping apparatus. The actuation system comprises:

(a) a shaft having a longitudinal axis;

(b) an actuator defining an actuator chamber therein having a peripheral chamber wall and wherein the actuator is movably mounted about the shaft such that the shaft extends through the actuator chamber and such that the actuator is longitudinally reciprocable thereon; and (c) a piston fixedly mounted about the shaft and positioned within the actuator chamber, wherein the piston has a first side, a second side and an outer perimeter sealingly engaging the peripheral chamber wall to create a first chamber adjacent the first side of the piston and a second chamber adjacent the second side of the piston such that the actuator reciprocates along the shaft in response to a differential force applied within the first chamber and the second chamber;

wherein the clamping assembly is associated with the actuator such that reciprocation of the actuator along the shaft causes the clamping assembly to move radially relative to the longitudinal axis of the shaft.

The clamping assembly may comprise a front clamping mechanism, a rear clamping mechanism or a backup ring assembly of a pipe clamping apparatus or any other similar assembly in which radial movement of internal clamping units is necessary. In the preferred embodiment, the clamping assembly is comprised of a backup ring assembly.

Further, the actuation system is preferably adapted to be mounted between a front clamping mechanism and a rear clamping mechanism in the pipe clamping apparatus as part of an internal backup ring system. More particularly, in the preferred embodiment, the shaft of the actuation system is adapted to be fixedly mounted between the front clamping mechanism and the rear clamping mechanism in the pipe clamping apparatus.

At least one of the first chamber and the second chamber is preferably adapted to contain a pressurized fluid for providing the differential force. In other words, the pressurized fluid applies a force in at least one of the first and second chambers, wherein the differential between the force applied in the first chamber and the force applied in the second chamber causes the actuator to reciprocate along the shaft. Where only one of the first or second chambers is adapted to contain a pressurized fluid, an opposing force in the other of the first and second chambers may be provided or applied by any mechanism capable of or suitable for urging the reciprocation of the actuator in the desired direction, such as a return or compression spring.

However, in the preferred embodiment, the first chamber is adapted to contain a first pressurized fluid and the second chamber is adapted to contain a second pressurized fluid, wherein the first pressurized fluid and the second pressurized fluid provide the differential force for reciprocating the actuator along the shaft. In other words, the actuator is caused to longitudinally reciprocate along the shaft in both directions as a result of the differential force provided by the first and second pressurized fluids.

Thus, the actuation system is further preferably comprised of a fluid feed mechanism associated with at least one of the first chamber and the second chamber for communicating the pressurized fluid to provide the differential force. In the preferred embodiment, the actuation system is comprised of a fluid feed mechanism associated with each of the first chamber and the second chamber for communicating the first pressurized fluid and the second pressurized fluid to provide the differential fluid. Either a hydraulic or pneumatic fluid feed mechanism may be used. In other words, the pressurized fluid may be any suitable liquid or gas. However, preferably the actuation system is pneumatically actuated or powered.

Any type or configuration of fluid feed mechanism capable of feeding, supplying, providing or otherwise communicating the desired first and second pressurized fluids to the first and second chambers respectively may be used. However, preferably, the fluid feed mechanism selectively communicates the first pressurized fluid to the first chamber and the second pressurized fluid to the second chamber to provide the differential force to selectively cause the actuator to reciprocate along the shaft in first and second directions.

In the preferred embodiment, the fluid feed mechanism is comprised of a first fluid port associated with the first chamber for communicating the first pressurized fluid to cause the actuator to reciprocate along the shaft in a first direction and a second fluid port associated with the second chamber for communicating the second pressurized fluid to cause the actuator to reciprocate along the shaft in a second direction. The first fluid port is comprised of one or more apertures, as required or desired, to permit the effective communication of the first pressurized fluid with the first chamber. Similarly, the second fluid port is comprised of one or more apertures, as required or desired, to permit the effective communication of the second pressurized fluid with the second chamber.

The fluid feed mechanism is further preferably comprised of a first fluid conduit for conducting the first pressurized fluid to the first fluid port and a second fluid conduit for conducting the second pressurized fluid to the second fluid port. The first and second fluid conduits may extend through the actuation system in any manner and along any path permitting the functioning of the actuation system, while providing the necessary pressurized fluid. However, preferably, at least a portion of each of the first and second fluid conduits extends through the shaft.

The clamping assembly may be associated with the actuator by any mechanism, apparatus or structure which permits the reciprocation of the actuator along the shaft to cause the clamping assembly to move radially relative to the longitudinal axis of the shaft for engaging the interior surface of the pipe. For instance, the clamping assembly may be directly mounted or affixed with the actuator. Alternately, the clamping assembly may be indirectly affixed or mounted with the actuator by one or more links or toggles such that reciprocation of the actuator causes the links or toggles to act upon the clamping assembly to move the clamping assembly radially to engage the interior surface of the pipe.

However, preferably the actuator is comprised of at least one camming surface and the clamping assembly is associated with the camming surface such that reciprocation of the actuator along the shaft moves the clamping assembly along the camming surface to cause the clamping assembly to move radially relative to the longitudinal axis of the shaft. More particularly, in the preferred embodiment, the backup ring assembly is associated with the camming surface such that reciprocation of the actuator along the shaft moves the backup ring assembly along the camming surface to cause the backup ring assembly to move radially relative to the longitudinal axis of the shaft.

The camming surface may be located on, about or within the actuator in any position and may have any structure or configuration permitting the camming surface to cause the radial movement of the backup ring assembly. Further, the camming surface may have any position or location on, about or within the actuator relative to the actuator chamber. The particular location or position of the camming surface may be determined, at least in part, by the size or diameter of the pipe in which the pipe clamping apparatus is to be inserted. For instance, the camming surface may be longitudinally spaced apart from the actuator chamber. In the preferred embodiment, the camming surface is radially spaced apart from the actuator chamber. Further, the actuator has an outer perimeter and the camming surfaces are preferably circumferentially spaced about the outer perimeter of the actuator.

Further, in the preferred embodiment, each camming surface preferably comprises a camming slot. Each camming slot preferably has an outermost end and the outermost end of each camming slot preferably extends to the outer perimeter of the actuator so that the backup shoe units are removable from the backup ring assembly when the backup shoe units are in the extended position and the pipe clamping apparatus is not positioned inside a pipe. A releasable retainer may also be associated with each backup shoe unit to releasably retain the backup shoe units relative to the camming slot when the backup shoe units are in the extended position and the pipe clamping apparatus is not positioned inside the pipe.

The actuator may be comprised of any type or configuration of housing, casing or enclosure which defines a chamber therein and which may be movably mounted about the shaft as discussed herein. Preferably, the actuator has a generally cylindrical outer perimeter. Further, in the preferred embodiment, the actuator is comprised of a cylinder defining the actuator chamber for containing the piston therein. Thus, the camming surfaces are associated with the cylinder, which is movable upon the piston fixedly mounted about the shaft. Further, the actuator chamber defined by the actuator may have any shape or configuration compatible with the piston positioned therein. Conversely, the piston may have any shape or configuration compatible with the actuator chamber in which it is received. However, in the preferred embodiment, the actuator chamber is cylindrical for receiving a disc-shaped piston.

Any backup ring assembly capable of accommodating the radial movements described herein may be used in the invention. In the preferred embodiment, the backup ring assembly is comprised of a plurality of backup shoe units. In this instance, the plurality of backup shoe units engage the camming surfaces so that reciprocation of the actuator along the shaft causes the backup shoe units to move radially relative to the longitudinal axis of the shaft by moving along the camming surfaces. Further, in the preferred embodiment, reciprocation of the actuator along the shaft in a first direction causes the backup shoe units to move radially outward toward an extended position for engaging the interior surface of the pipe and reciprocation of the actuator along the shaft in a second direction causes the backup shoe units to move radially inward toward a retracted position.

The backup shoe units are preferably capable of a limited range of radial movement between an inner limit and an outer limit without reciprocation of the actuator along the shaft. Further, each of the backup shoe units preferably comprises an urging mechanism for urging the backup shoe units toward the outer limit of the limited range of radial movement. Any biasing device or mechanism capable of urging the backup shoe units in the desired manner, such as a spring, may be used.

Preferably, the outer limit of the limited range of radial movement is substantially similar for each backup shoe unit. However, the outer limit of the limited range of radial movement of the backup shoe units may vary so that reciprocation of the actuator along the shaft in the second direction causes the backup shoe units to move radially inward sequentially toward the retracted position as the backup shoe units sequentially reach the outer limit of the limited range of radial movement.

The outer limit of the limited range of radial movement may be varied in any manner compatible with the operation of the backup shoe units. However, preferably, the outer limit of the limited range of radial movement of the backup shoe units is varied, where it is desired to do so, by inserting one or more shims in the backup shoe units to alter the outer limit. The backup ring system may also be adapted for use with different sizes of pipes by using one or more shims to selectively increase or decrease the outer limit of the limited range of radial movement.

The shaft of the actuation system is preferably adapted to be fixedly mounted in the pipe clamping apparatus. As stated, where the clamping apparatus is a backup ring assembly, the shaft is adapted to be fixedly mounted between the front and rear clamping mechanisms. More particularly, the shaft is preferably fixedly mounted in a manner such that the longitudinal movement of the shaft within the actuation system, that is, movement along its longitudinal axis, is inhibited. As a result, the actuator is movable along the fixed shaft. Further, the shaft is preferably fixedly mounted in a manner such that rotation of the shaft within the actuator is inhibited.

Preferably, the actuation system is further comprised of an alignment plate disposed in a plane which is substantially perpendicular to the longitudinal axis of the shaft, wherein the alignment plate is fixedly mounted about the shaft such that the shaft extends therethrough. The alignment plate is preferably adapted to be fixedly mounted or connected with the pipe clamping apparatus so that the alignment plate is inhibited from longitudinally or rotationally moving relative to, or within, the pipe clamping apparatus. Further, the alignment plate preferably comprises a guide ring extending about a perimeter of the alignment plate in a plane substantially perpendicular to the plane of the alignment plate in a direction toward the actuator so that that the alignment plate defines an actuator housing and wherein the actuator is contained within the actuator housing.

The backup shoe units are preferably received in and extend through the guide ring. The backup shoe units may be received in the guide ring in any manner compatible with the operation of the backup ring assembly. However, preferably the guide ring defines a plurality of sleeves for receiving the plurality of backup shoe units. The guide ring may have any structure or configuration capable of providing the actuator housing.

The actuation system may also be comprised of an auxiliary mechanism for dislodging the backup ring assembly when at least one of the backup shoe units is stuck to the interior surface of the pipe in the extended position and cannot be dislodged by the primary mechanism. The auxiliary dislodging mechanism may be associated either with one or more of the backup shoe units or with the actuator, and may include one or more of the following auxiliary dislodging mechanisms or some other mechanism, member or structure which performs a dislodging function.

Where at least one of the front clamping mechanism and the rear clamping mechanism is capable of radial movement inward and outward relative to the longitudinal axis of the shaft, the auxiliary dislodging mechanism may be comprised of an engagement surface on at least one of the backup shoe units for engaging at least one of the front clamping mechanism and the rear clamping mechanism in response to inward radial movement of the clamping mechanism when the backup shoe unit is not in the retracted position in order to urge the backup shoe unit radially inward.

The auxiliary dislodging mechanism may also be comprised of a variance of the outer limit of the limited range of radial movement of the backup shoe units. As stated above, the outer limit of the limited range of radial movement of the backup shoe units may vary so that reciprocation of the actuator along the shaft in the second direction causes the backup shoe units to move radially inward sequentially toward the retracted position as the backup shoe units sequentially reach the outer limit of the limited range of radial movement. This sequential radially inward movement may act to dislodge the backup ring assembly.

The auxiliary dislodging mechanism may also be comprised of a variance in the configuration of two or more of the camming surfaces on the actuator so that reciprocation of the actuator along the shaft in the second direction causes the backup shoe units to move radially inward sequentially toward the retracted position as the backup shoe units sequentially reach the outer limit of the limited range of radial movement. The configuration of the camming surfaces is preferably varied by varying one or more of their shape or slope or their distance from the longitudinal axis of the shaft.

Whether the outer limit of the limited range of radial movement of the backup shoe units is varied or the configuration of each of the camming surfaces is varied, the backup shoe units may move radially inward sequentially in any manner. In particular, the backup shoe units may move radially inwardly sequentially either individually or in one or more groupings of backup shoe units. Further, each individual backup shoe unit or each grouping of backup shoe units may move E) radially inwardly in any order or succession as compared with any other individual backup shoe unit or any other grouping of backup shoe units.

The clamping assembly may be actuated by the actuation system in any order or in any sequence as compared with the other components of the pipe clamping mechanism. For instance, in the preferred embodiment, the backup ring assembly may be actuated concurrently with one or both of the front and rear clamping mechanisms of the pipe clamping apparatus. However, preferably, the backup ring assembly is actuated independently of both the front clamping mechanism and the rear clamping mechanism.

Finally, the front clamping mechanism of the pipe clamping apparatus is preferably of a type capable of radial movement relative to the longitudinal axis of the shaft between an extended position and a retracted position. Similarly, the rear clamping mechanism is preferably of a type capable of radial movement relative to the longitudinal axis of the shaft between an extended position and a retracted position.

In the retracted positions, the front clamping mechanism, the rear clamping mechanism and the backup ring assembly may each extend any distance from the longitudinal axis of the shaft. However, in the preferred embodiment, in the retracted positions at least the front clamping mechanism, and most preferably the rear clamping mechanism as well, extend further from the longitudinal axis of the shaft than does the backup ring assembly. This configuration may serve to protect the backup ring assembly from damage when moving through the pipe.

Conversely, the backup ring assembly is capable of extending at least as far and preferably further from the longitudinal axis of the shaft than are the front clamping mechanism or the rear clamping mechanism when each of the front clamping mechanism, the rear clamping mechanism and the backup ring assembly are in the extended position, thus enabling the backup ring assembly to engage the interior surface of the pipe under such conditions.

As a result, the radial distance of travel of the backup ring assembly between the extended and retracted positions is preferably greater than the radial distance of travel of the front and rear clamping mechanisms between these positions. Since the radial distance of travel of the backup ring assembly is a function of the amount of longitudinal reciprocation or longitudinal travel of the actuator between the extended and retracted positions and the slope of the camming surfaces, the radial distance of travel of the backup ring assembly may be varied by varying these parameters in order to achieve the desired radial distance of travel.

BRIEF DESCRIPTION OF DRAWINGS

Embodiments of the invention will now be described with reference to the accompanying drawings, in which.

DETAILED DESCRIPTION

The within invention is directed at an actuation system for a pipe clamping apparatus. More particularly, the actuation system is provided for actuating a clamping assembly comprising the pipe clamping apparatus. Although the actuation system may be adapted to be used for actuating any clamping assembly, such as a front clamping assembly or mechanism or a rear clamping assembly or mechanism in a pipe clamping apparatus, the actuation system is preferably adapted for use in actuating a backup ring assembly. In this preferred embodiment, the combination of the actuation system and the backup ring assembly actuated thereby are referred to as a backup ring system.

Figure 1:
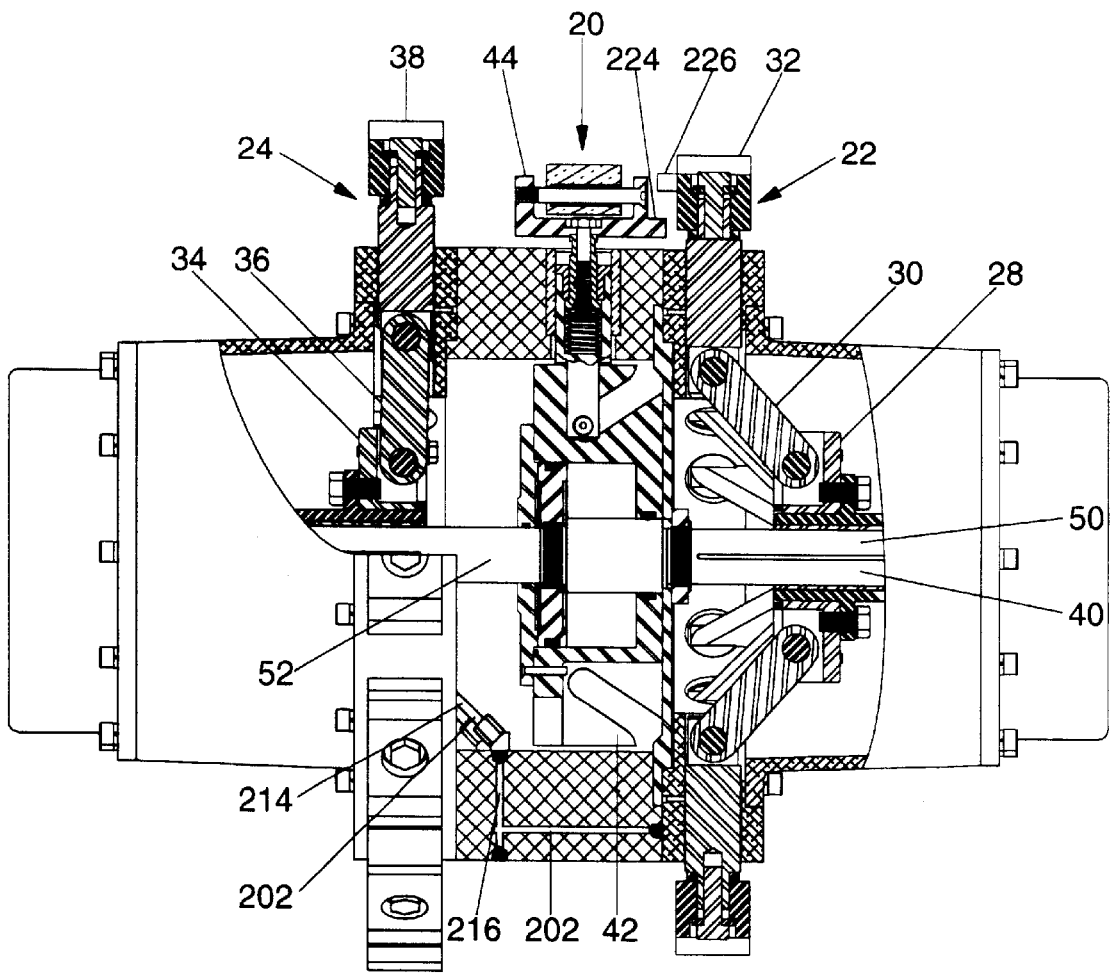
FIG. 1 is a side view, partly in section, of a pipe clamping apparatus including a preferred embodiment of an actuation system and a backup ring assembly of the within invention mounted between a front clamping mechanism and a rear clamping mechanism, showing a side view of a backup shoe unit comprising the backup ring assembly.

Thus, referring to FIG. 1, the preferred embodiment of the within invention relates to an internal backup ring system (20) for engaging an interior surface of a pipe and is preferably provided for mounting in a pipe clamping apparatus having a front pipe clamping mechanism (22) and a rear pipe clamping mechanism (24). The invention may be used with various types of pipe clamping apparatuses having a front clamping mechanism (22) and a rear clamping mechanism (24), provided that the clamping mechanisms (22, 24) can be separated to facilitate mounting of the backup ring system (20) therebetween. The backup ring system (20) may be manufactured as an element or portion of the pipe clamping apparatus. However, preferably, the backup ring system (20) comprises a separate, independent unit which is mountable in the pipe clamping apparatus. Specifically, the backup ring system (20) is preferably configured to be retrofittable with such pipe clamping apparatuses.

In this specification, a "pipe" includes any length of hollow conduit or tubing which will permit the passing of a pipe clamping apparatus therethrough and which typically is connected with other lengths of conduit or tubing. In the preferred embodiment, the backup ring system (20) is intended for use in conjunction with lengths of metal conduit which are connected together by welding. Further, the backup ring system (20) may be used with a pipe having any diameter. The preferred embodiment of the backup ring system (20) has been found to be particularly suitable for use within medium to smaller diameter pipes, such as those having a diameter of between about 16 inches (40.64 cm) and 32 inches (81.28 cm). However, as indicated, the backup ring system (20) may also be used in both smaller and larger diameter pipes.

Specifically, the backup ring system (20) is configured to be mounted in a pipe clamping apparatus between the front clamping mechanism (22) and the rear clamping mechanism (24). Once mounted, the pipe clamping apparatus may be used either with or without the engagement of the backup ring system (20). This is permissible as the backup ring system (20) is preferably configured such that it may be actuated, where desired, independently of the actuation of either or both of the front and rear clamping mechanisms (22, 24). Independent actuation is preferred so that, amongst other reasons, the adjacent pipe sections may be positioned, fitted and wedged as desired prior to engaging the backup ring system (20) with the interior surface of the pipe n order to minimize the potential for any damage to be caused to the backup ring system (20) during this operation.

Pipe clamping apparatuses are typically designed to exert a radial pressure against an interior surface or inner wall of two adjacent joints or sections of pipe to be welded together. Specifically, the pipe clamping apparatus aligns and holds the adjacent ends of the pipe sections in a desired orientation during the welding operation or the welding of the root or stringer bead.

Typically, the pipe clamping apparatus has a front end and a rear end and includes a nose guide (not shown) located adjacent the front end of the apparatus, a rear frame (not shown) located adjacent the rear end of the apparatus and a centrebox located therebetween. Further, the apparatus includes an air tank or other pneumatic or hydraulic mechanism (not shown) for driving the apparatus including the front and rear clamping mechanisms (22, 24). Finally, the apparatus preferably includes a dog latch (not shown) or other mechanism for properly positioning the apparatus, and in particular the front and rear clamping mechanisms (22, 24), at the point of the weld.

The nose guide (not shown) may include various controls, such as drive and brake controls for the apparatus and expand and retract controls for the front and rear clamping mechanisms (22, 24). The rear frame (not shown) may house or include one or more of front carrier wheel assemblies, rear carrier wheel assemblies, a brake assembly and a clamp drive assembly.

The front carrier wheel assemblies (not shown) are typically mounted at a lower or bottom surface of the rear frame adjacent the forwardmost end of the rear frame, being the end nearest or closest to the front end of the apparatus. Further, the front carrier wheel assemblies are typically symmetrically spaced and are axially adjustable for contact with the interior surface of the pipe. The rear carrier wheel assemblies (not shown) are typically mounted at the lower or bottom surface of the rear frame adjacent the rearwardmost end of the rear frame, being the end nearest or closest to the rear end of the apparatus. Similarly, the rear carrier wheel assemblies are typically axially adjustable for contact with the interior surface of the pipe.

The brake assembly (not shown) is typically mounted at an upper or top surface of the rear frame. The brake assembly includes one or more axially extendible brake pads and one or more pneumatic brake cylinders for extending the brake pads axially outward for contact with the interior surface of the pipe in order to inhibit or impede further travel of the pipe clamping apparatus in the pipe. Preferably, the brake pads are urged toward a retracted or non-extended position when not in use by a spring-loaded or like mechanism. In addition, the brake assembly tends to facilitate or enhance the contact between the interior surface of the pipe and the rear carrier wheel assemblies during the alignment of the apparatus in the pipe by urging the rear carrier wheel assemblies into full contact with the adjacent pipe surface upon extension of the brake pads.

The clamp drive assembly (not shown) typically includes two or more sets of pivoting drive wheels powered by one or more reversible air motors. At least one set of drive wheels is located on opposing side surfaces of the rear frame. One or more double acting pneumatic cylinders, or other drive mechanism, urges the drive wheels outward from each side surface of the rear frame for contact with the interior surface of the pipe. Activation of the air motors powers the drive wheels and thereby propels the pipe clamping apparatus, causing it to travel either forward or rearward within the pipe.

The centrebox of the pipe clamping apparatus typically includes the front clamping mechanism (22) and the rear clamping mechanism (24). Further, the front and rear clamping mechanisms (22, 24) are typically aligned by a center shaft. The center shaft acts as a centering and alignment guide for the front and rear clamping mechanisms (22, 24) during the welding operation. The center shaft extends longitudinally through at least a portion of the pipe clamping apparatus between its front and rear ends. As well, at least one double acting air cylinder (not shown), or other drive mechanism, is associated with each of the front and rear clamping mechanisms (22, 24). These air cylinders preferably operate independently of each other such that the front and rear clamping mechanisms may be actuated independently of each other. More particularly, preferably, a front air cylinder actuates the front clamping mechanism (22) and an independent rear air cylinder actuates the rear clamping mechanism (24).

The front clamping mechanism (22) is capable of radial movement relative to a longitudinal axis defined by the center shaft of the apparatus such that the front clamping mechanism (22) may be moved between an extended position, in contact with the interior surface of the pipe, and a retracted position, out of contact with the interior surface. Actuation of the double acting front air cylinder causes the front clamping mechanism (22) to move between its extended and retracted positions as desired. Similarly, the rear clamping mechanism (24) is capable of radial movement relative to the longitudinal axis of the pipe clamping apparatus such that the rear clamping mechanism (24) may also be moved between an extended position, in contact with the interior surface of the pipe, and a retracted position, out of contact with the interior surface. Actuation of the double acting rear air cylinder causes the rear clamping mechanism (24) to move between its extended and retracted positions as desired.

The front and rear clamping mechanisms (22, 24) may be comprised of any structure, mechanism, elements or devices capable of moving the clamping mechanisms (22, 24) between their retracted and extended positions in the manner described herein. Preferably, a structure, mechanism, elements or devices are provided which are compatible with the use of the front and rear air cylinders described above. As well, each of the front and rear clamping mechanisms (22, 24) is preferably comprised of a plurality of clamping shoe units which are retractable and extendible radially thereby for engagement with the interior surface of the pipe sections to be welded. Any type of clamping shoe units may be used as long as they are compatible with the internal backup ring system (20).

Although either or both of the front and rear clamping mechanisms (22, 24) may utilize the same actuation system as described herein with respect to the internal backup ring system (20), a preferred conventional front clamping mechanism (22) is depicted in FIG. 1 which includes a front spider linkage assembly (28) comprised of a plurality of toggle links (30). Each toggle link (30) is connected with a front clamping shoe unit (32). Upon the extension of the front air cylinder, the front air cylinder acts on the front spider linkage assembly (28) to cause the toggle links (30) therein to move into a substantially vertical position. Movement of the toggle links (30) towards a vertical position causes the front clamping shoe units (32) to move radially outward towards the extended position such that the front clamping shoe units (32) are urged into contact with the interior surface of the pipe. Conversely, upon the retraction of the front air cylinder, the front spider linkage assembly (28) causes the toggle links (30) to move away from the vertical position. As a result, the front clamping shoe units (32) are moved radially inward towards the retracted position such that the front clamping shoe units (32) are out of contact with the interior surface of the pipe as shown in FIG. 1.

A preferred conventional rear clamping mechanism (24) similarly includes a rear spider linkage assembly (34) comprised of a plurality of toggle links (36) as shown in FIG. 1. Each toggle link (36) is connected with a rear clamping shoe unit (38). Upon the extension of the rear air cylinder, the rear air cylinder acts on the rear spider linkage assembly (34) to cause the toggle links (36) therein to move into a substantially vertical position as shown in FIG. 1. Movement of the toggle links (36) towards a vertical position causes the rear clamping shoe units (38) to move radially outward towards the extended position such that the rear clamping shoe units (38) are urged into contact with the interior surface of the pipe. Conversely, upon the retraction of the rear air cylinder, the rear spider linkage assembly (34) causes the toggle links (36) to move away from the vertical position. As a result, the rear clamping shoe units (38) are moved radially inward towards the retracted position such that the rear clamping shoe units (38) are out of contact with the interior surface of the pipe.

Further, as stated, conventional pipe clamping apparatuses typically include a dog latch (not shown) or other mechanism for properly positioning the apparatus, and in particular the front and rear clamping mechanisms (22, 24) at the point of the weld. The dog latch typically rides against the interior surface of the pipe and engages the open end of the pipe section (not shown) in order to properly position the pipe clamping apparatus at the point of welding. Specifically, the dog latch positions the pipe clamping apparatus at the open end of a rear pipe section prior to bringing the next section of pipe, being a front pipe section, into position so that the adjacent ends of the front and rear pipe sections may be welded together.

Finally, as stated, the pipe clamping apparatus includes a mechanism for driving the apparatus such as a pneumatic or hydraulic system (not shown). For instance, with respect to the apparatus described above, the pipe clamping apparatus is comprised of an air tank for actuating the front and rear clamp air cylinders, the pneumatic brake cylinders, the pneumatic drive wheel cylinders and the drive wheel air motors. The air tank preferably provides a reservoir of compressed air so that these various systems are operational while the air tank is disconnected from the air supply hose.

Typically, once the dog latch (not shown) properly positions the pipe clamping apparatus, the rear clamping mechanism (24), which is positioned in the rear pipe section, is actuated to extend the rear clamping shoe units (38) to the extended position for engagement with the interior surface of the rear pipe section. The front pipe section is then positioned about the front end of the pipe clamping apparatus, and in particular, about the front pipe clamping mechanism (22), such that the adjacent ends of the front and rear pipe sections are spaced a desired distance apart for the welding operation. The front clamping mechanism (22) is then actuated to extend the front clamping shoe units (32) to the extended position for engagement with the interior surface of the front pipe section.

Referring to FIG. 1, the internal backup ring system (20) is mounted between the front and rear clamping mechanisms (22, 24). The backup ring system (20) may be mounted in any manner permitting the operation of the backup ring system (20), including the actuation system, as described herein, preferably independently of the actuation of the front and rear clamping mechanisms (22, 24). However, as described in detail below, the backup ring system (20) is preferably mounted by replacing or substituting the center shaft typically found in the pipe clamping apparatus with a replacement shaft or insert shaft (40). The insert shaft (40) of the backup ring system (20) preferably extends within the front and rear clamping mechanisms (22, 24) such that the shaft (40) of the backup ring system (20) centers and aligns the front and rear clamping mechanisms (22, 24) in relation to the backup ring system (20).

Figure 2:
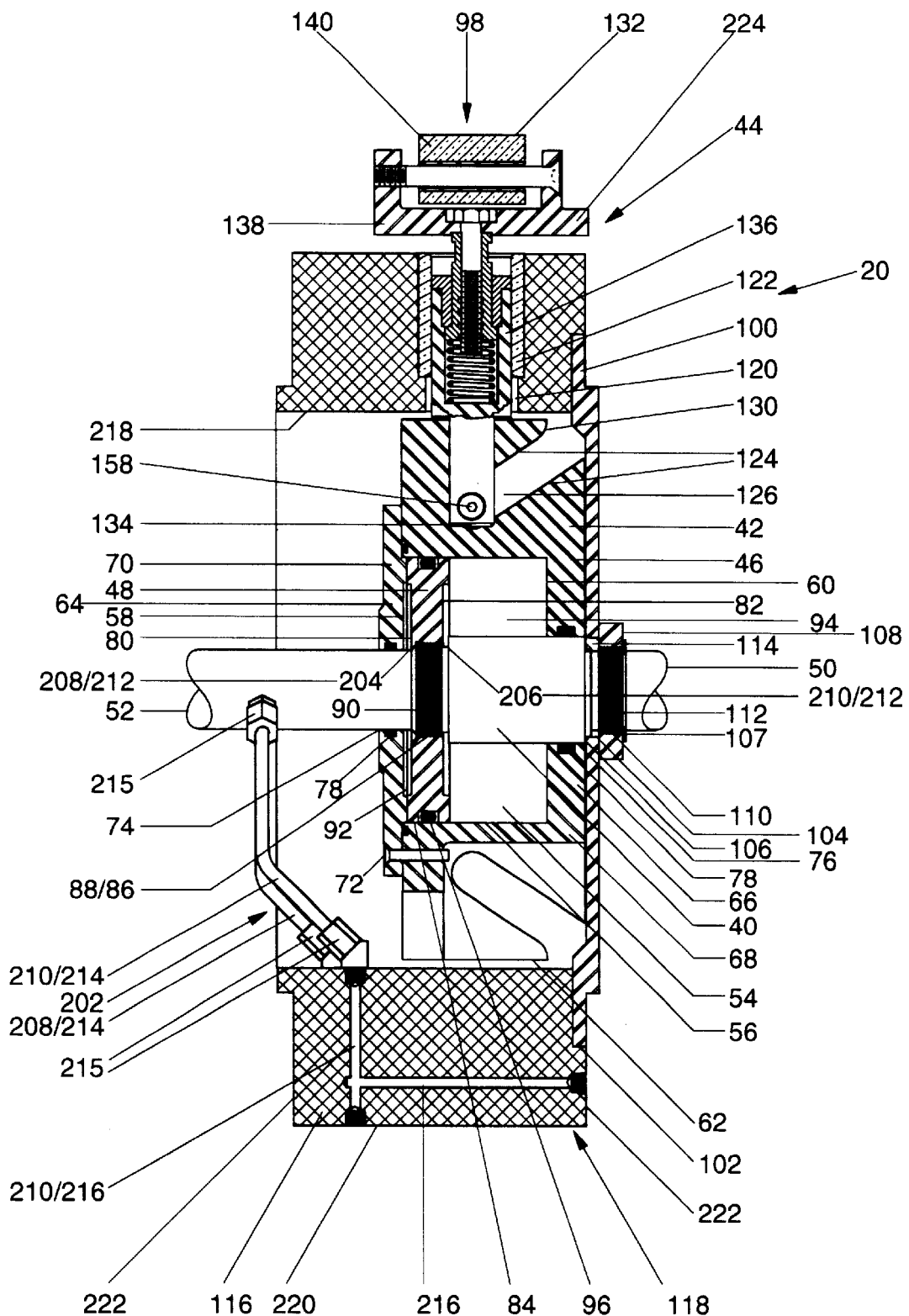
FIG. 2 is a side view, partly in section, of the actuation system and backup ring assembly shown in FIG. 1, in isolation from the front and rear clamping mechanisms, wherein the actuation system is comprised of a shaft and an actuator.

Referring to FIGS. 1 and 2, the backup ring system (20) includes an actuation system (42) for a clamping assembly, preferably a backup ring assembly (44), for engaging an interior surface of a pipe. The actuation system (42) is comprised of the insert shaft (40), an actuator (46) and a piston (48). The insert shaft (40) has a longitudinal axis extending therethrough between a front end (50) of the shaft (40) and a rear end (52) of the shaft (40). The shaft (40) may be comprised of a single elongated member or unit or may be comprised of two or more elongated members or units affixed or joined together to form the shaft (40). Further, the shaft (40) may be solid, however, for the reasons discussed below, preferably at least a portion of the shaft (40) is hollow or provides a conduit, orifice or duct therein such that a fluid may be conducted therethrough.

Preferably, as shown in FIG. 1, the insert shaft (40) is adapted to be fixedly mounted between the front and rear clamping mechanisms (22, 24). Both the actuator (46) and the piston (48) are mounted within the pipe clamping apparatus by the shaft (40). More particularly, the front end (50) of the shaft (40) extends within the front clamping mechanism (22), while the rear end (52) of the shaft (40) extends within the rear clamping mechanism (24). Further, the shaft (40) extends through each of the actuator (46) and the piston (48), which are positioned between the front and rear clamping mechanisms (22, 24). Thus, the shaft (40) aligns the front and rear clamping mechanisms (22, 24) in relation to the backup ring system (20). As well, the shaft (40) is preferably fixedly mounted or connected with each of the front and rear clamping mechanisms (22, 24) at its front and rear ends (50, 52) respectively. In other words, the shaft (40) remains stationary relative to the front and rear clamping mechanisms (22, 24) and is inhibited from moving both longitudinally and rotationally relative to the clamping mechanisms (22, 24).

The actuator (46) defines an actuator chamber (54) therein having a peripheral chamber wall (56), a first end wall (58) and a second end wall (60). The actuator (46) is movably mounted about the shaft (40) such that the actuator (46) is longitudinally reciprocable thereon. In other words, the actuator (46) is longitudinally reciprocable along the fixed or stationary shaft (40). More particularly, the actuator (46) is permitted to reciprocate in a first direction and an opposed second direction. The actuator (46) may be movably mounted about the shaft (40) in any manner and by any mechanism permitting the reciprocation of the actuator (46) along the shaft (40).

However, referring to FIGS. 1 and 2, in the preferred embodiment the actuator (46) is movably mounted about the shaft (40) such that the shaft (40) extends through the actuator chamber (54). More particularly, the shaft (40) extends through the actuator chamber (54) between the first and second end walls (58, 60). Further, the actuator (46) is preferably mounted such that a longitudinal axis of the actuator (46) extending between the first and second end walls (58, 60) coincides with the longitudinal axis of the shaft (40).

The actuator (46) may be comprised of a single element, component, member or unit or it may be comprised of two or more elements, components, members or units permanently or detachably affixed or mounted together to form the complete actuator (46). In the preferred embodiment, the actuator (46) has an outer perimeter (62), a first end (64) and a second end (66). The first end wall (58) of the actuator chamber (54) is defined by or associated with the first end (64) of the actuator (46), while the second end wall (60) of the actuator chamber (54) is defined by or associated with the second end (66) of the actuator (46). One or both of the first and second ends (64, 66) may be integrally formed with the outer perimeter (62) of the actuator (46) or may be comprised of an end plate affixed with the remainder or balance of the actuator (46).

Figure 3:
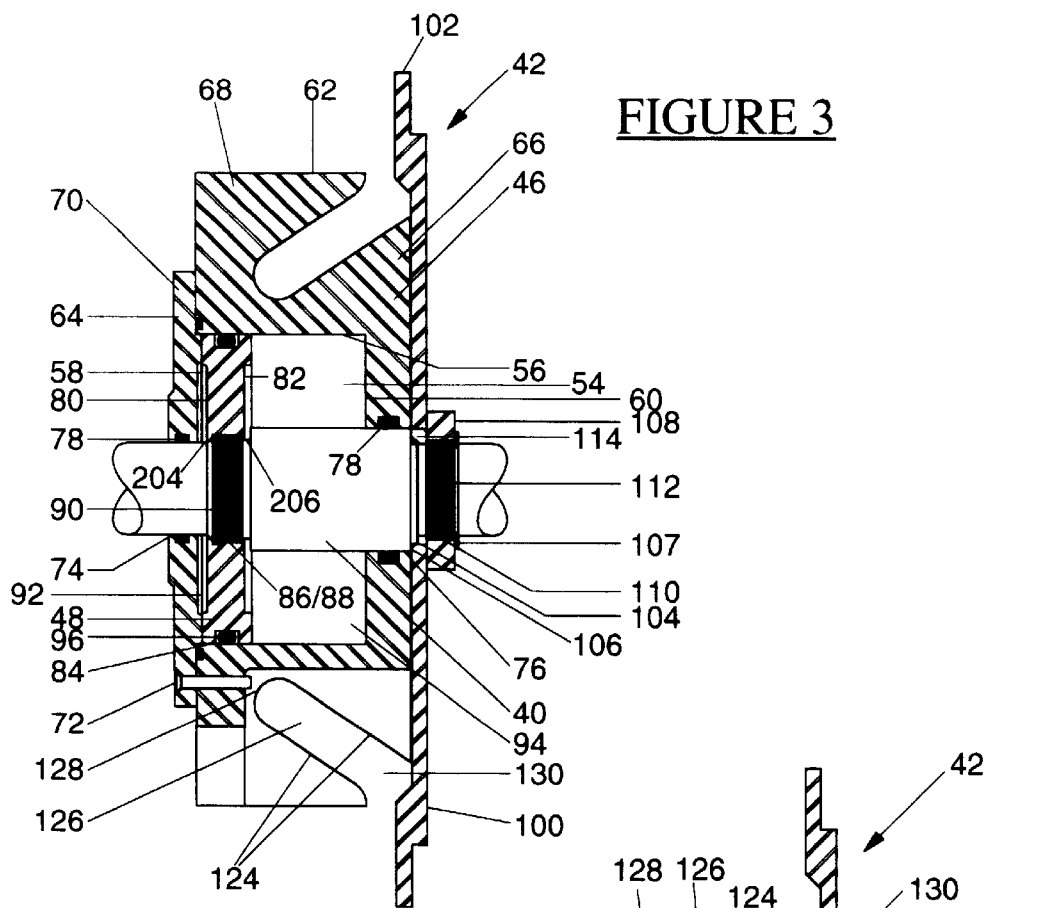
FIG. 3 is a side view, partly in section, of the actuation system shown in FIG. 2 showing a preferred embodiment of the actuator.
Figure 4:
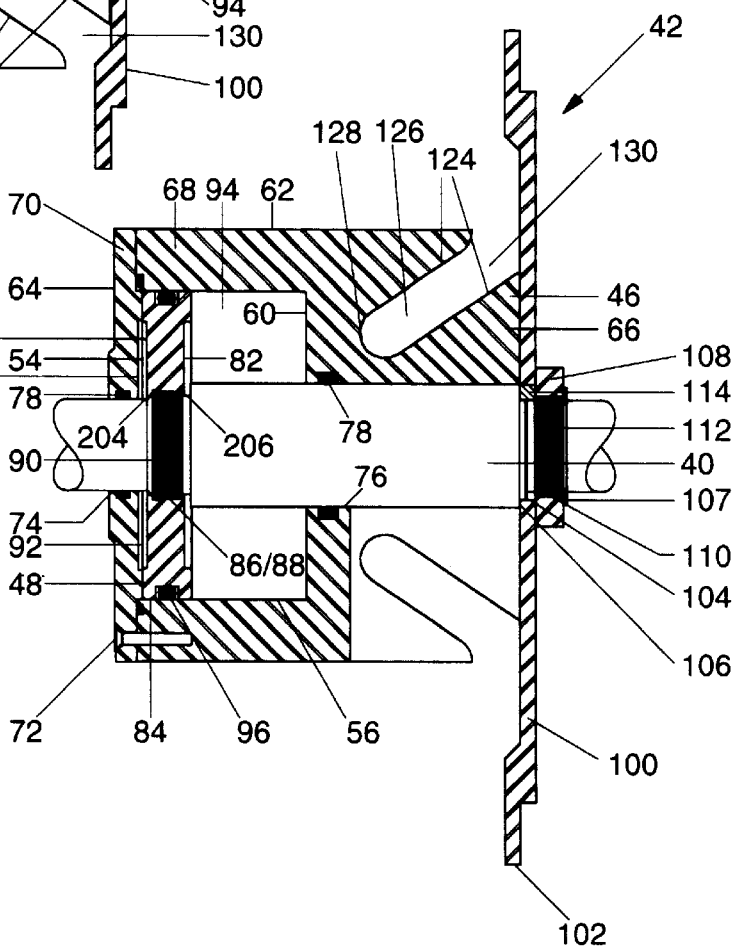
FIG. 4 is a side view, partly in section, of the actuation system shown in FIG. 2 showing an alternate embodiment of the actuator.
Figure 5:
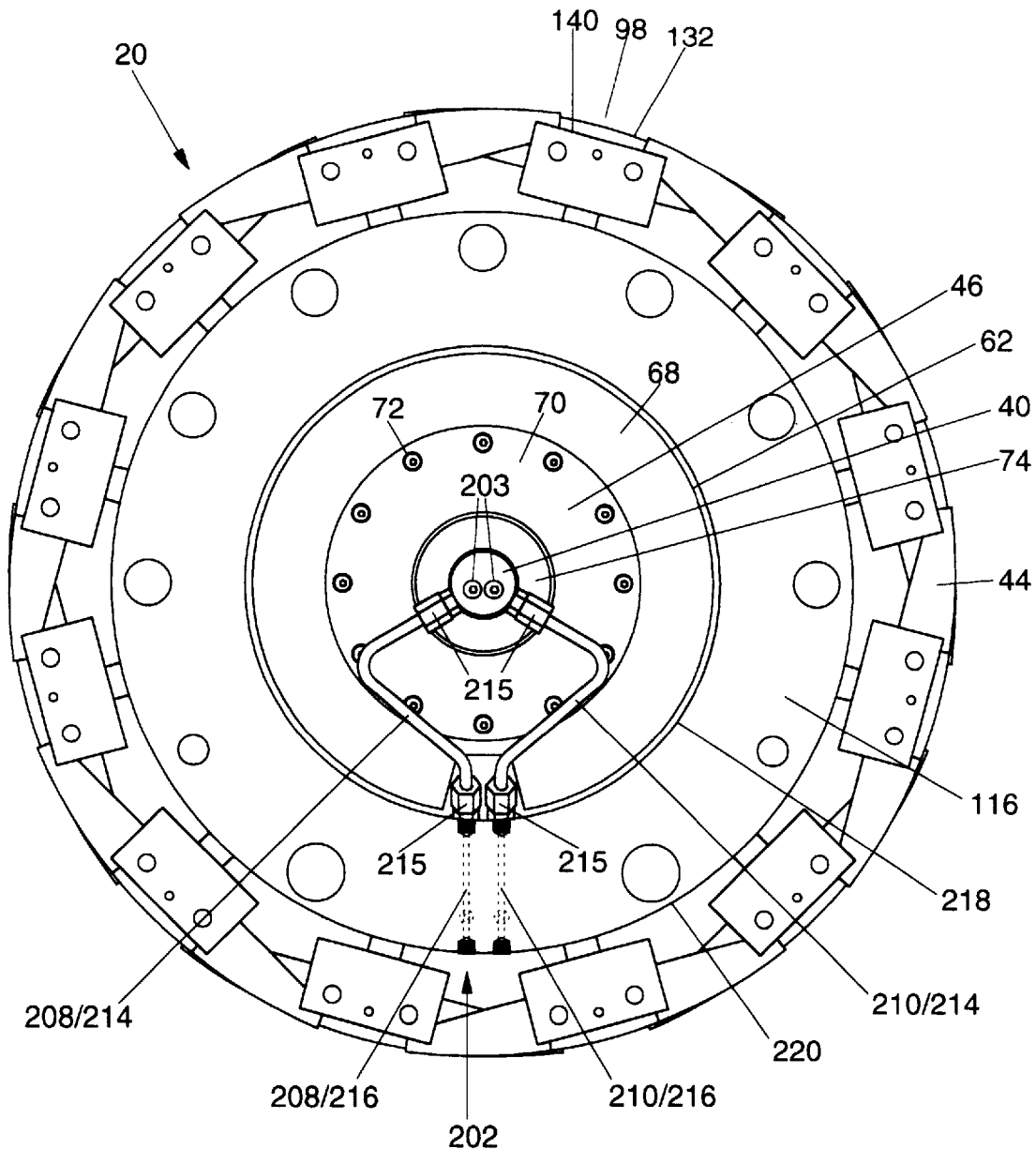
FIG. 5 is a rear view of the actuation system and backup ring assembly shown in FIG. 2.

Referring to FIGS. 2–4, in the preferred embodiment, the actuator (46) is comprised of two components, being an actuator sleeve (68) and an end plate (70). More particularly, the actuator sleeve (68) defines the outer perimeter (62) and the second end (66) of the actuator (46). The first end (64) of the actuator (46) is defined by the end plate (70) which is preferably detachably or removably mounted or affixed with the actuator sleeve (68) to permit access to the actuator chamber (54). The end plate (70) is affixed to the actuator sleeve (68) by one or more fasteners (72), such as screws or bolts.

The end plate (70) comprising the first end (64) of the actuator (46) defines a first aperture (74) therein. Similarly, the actuator sleeve (68) comprising the second end (66) of the actuator (46) defines a second aperture (76) therein. When the actuator (46) is mounted about the shaft (40), the shaft (40) is slidably received in the first and second apertures (74, 76) and extends therebetween. In the preferred embodiment, the shaft (40) sealingly engages the first and second apertures (74, 76) as it extends therethrough in order to inhibit the passage of any fluids or debris either into or out of the actuator chamber (54) through the apertures (74, 76). Any seal, sealing assembly or sealing mechanism maybe used to seal the first and second apertures (74, 76) with the adjacent shaft (40). However, in the preferred embodiment, at least one O-ring (78) or other seal is associated with or mounted within each of the first and second apertures (74, 76).

The actuator (46) may have any shape or configuration so long as the actuator (46) is permitted to longitudinally reciprocate within the pipe clamping apparatus. However, preferably, the actuator (46) has or defines a generally or substantially cylindrical outer perimeter (62). Similarly, the actuator chamber (54) may have any shape or configuration compatible with the piston (48) positioned therein. However, preferably, the peripheral chamber wall (56) of the actuator chamber (54) is also cylindrical.

Further, the piston (48) has a first side (80), a second side (82) and an outer perimeter (84) or outermost surface. The piston (48) is fixedly mounted about the shaft (40) and positioned within the actuator chamber (54). The piston (48) may be mounted about the shaft (40) in any manner and by any mounting mechanism fixing or maintaining the position of the piston (48) longitudinally relative to the longitudinal axis of the shaft (40). In other words, the piston (48) is not longitudinally movable or reciprocable along the shaft (40). Further, it is preferable that the piston (48) is also mounted or fixed with the shaft (40) in a manner and by a mounting mechanism further inhibiting the rotational movement of the piston (48) relative to the shaft (40). Thus, in the preferred embodiment, the piston (48) is both rotationally and longitudinally fixedly mounted about the shaft (40).

In particular, in the preferred embodiment, the piston (48) defines an aperture (86) extending between the first and second sides (80, 82) of the piston (48) for the passage of the shaft (40) therethrough. Preferably, the aperture (86) is substantially centrally located within the piston (48) relative to its outer perimeter (84). The central aperture (86) is either permanently or removably fixedly mounted with the adjacent surface of the shaft (40). For instance, the piston (48) may be integrally formed with the shaft (40) or may be permanently mounted thereto such as by welding. However, preferably, the piston (48) is detachably or removably mounted about the shaft (40) for ease of assembly and maintenance. In the preferred embodiment, the central aperture (86) defines a threaded inner surface (88), while the shaft (40) defines a compatible threaded outer surface (90). Thus, the threaded engagement of the inner and outer threaded surfaces (88, 90) fixedly mounts the piston (48) about the shaft (40).

The piston (48) is positioned within the actuator chamber (54) such that the outer perimeter (84) of the piston (48) engages the peripheral chamber wall (56) to create a first chamber (92) adjacent the first side (80) of the piston (48) and a second chamber (94) adjacent the second side (82) of the piston (48). Preferably, the outer perimeter (84) of the piston (48) sealingly engages the peripheral chamber wall (56) to inhibit the passage of debris or fluids between the first and second chambers (92, 94). Any seal, sealing assembly or sealing mechanism maybe used to seal the outer perimeter (84) with the adjacent peripheral chamber wall (56). However, in the preferred embodiment, at least one O-ring (96) or other seal is associated with or mounted about the outer perimeter (84) of the piston (48).

The piston (48) may have any shape or configuration compatible with the actuator chamber (54) such that the actuator (46) is permitted to reciprocate along the shaft (40). However, preferably, the piston (48) is disc shaped such that the piston (48) has a cylindrical outer perimeter (84).

Given that the piston (48) is fixedly mounted about the shaft (40) while the actuator (46) is movably mounted about the shaft (40), the actuator (46) reciprocates along the shaft (40) in response to a differential force applied within the first chamber (92) and the second chamber (94). More particularly, a first force is applied within the first chamber (92). Specifically, a longitudinal force is preferably applied to the first end wall (58) of the actuator chamber (54) to move the actuator (46) in a first longitudinal direction along the shaft (40). A second force is applied within the second chamber (94). Specifically, a longitudinal force is preferably applied to the second end wall (60) of the actuator chamber (54) to move the actuator (46) in a second longitudinal direction along the shaft (40). The differential forces applied within the first and second chambers (92, 94) determines the direction in which the actuator (46) reciprocates.

The longitudinal force within each of the first and second chambers (92, 94) may be provided or applied by any mechanism or member capable of or suitable for urging the reciprocation of the actuator (46) in the desired direction such as a return or compression spring. For instance, a spring may be located within one or both of the first and second chambers (92, 94) acting between the fixed piston (48) and the respective end wall (58, 60) of the actuator chamber (54).

However, preferably, at least one of the first chamber (92) and the second chamber (94) is preferably adapted to contain a pressurized fluid for providing or applying a force therein to provide the differential force. In other words, the pressurized fluid applies the first or second force in at least one of the first and second chambers (92, 94) respectively, wherein the differential between the first and second forces causes the actuator (46) to reciprocate along the shaft (40). In the preferred embodiment, the first chamber (92) is adapted to contain a first pressurized fluid and the second chamber (94) is adapted to contain a second pressurized fluid. Thus, the first pressurized fluid and the second pressurized fluid provide the differential force for reciprocating the actuator (46) along the shaft (40).

A clamping assembly for engaging the interior surface of the pipe is associated with the actuator (46) such that reciprocation of the actuator (46) along the shaft (40) causes the clamping assembly to move radially relative to the longitudinal axis of the shaft (40). The clamping assembly may comprise a front clamping mechanism (22) including a front clamping shoe unit (32), a rear clamping mechanism (24) including a rear clamping shoe unit (38), a backup ring assembly (44) or any other similar assembly in which radial movement of internal clamping units is necessary. In the preferred embodiment, the clamping assembly is comprised of the backup ring assembly (44).

Referring to FIGS. 1–2 and 5–6, the backup ring assembly (44) is associated with the actuator (46) in a manner such that the reciprocation of the actuator (46) along the shaft (40) causes the backup ring assembly (44) to move radially relative to the longitudinal axis of the shaft (40). Any type of backup ring assembly (44) may be used as long as it is capable of moving radially in response to the reciprocation of the actuator (46). However, preferably, the backup ring assembly (44) is comprised of two or more backup shoe units (98). In the preferred embodiment, the backup ring assembly (44) comprises a plurality of backup shoe units (98) movable radially in response to the reciprocation of the actuator (46) along the shaft (40).

More particularly, preferably, reciprocation of the actuator (46) along the shaft (40) in a first direction causes the backup shoe units (98) to move radially outward, relative to the longitudinal axis of the shaft, toward an extended position for engaging the interior surface of the pipe. Specifically, the backup shoe units (98) move outwardly for engagement with the interior surface of each of the pipe sections to be welded at their respective adjacent ends. Conversely, reciprocation of the actuator (46) along the shaft in a second direction, opposite the first direction, causes the backup shoe units (98) to move radially inward, relative to the longitudinal axis of the shaft (40), toward a retracted position. In the retracted position, the backup shoe units (98) are moved away from the interior surface of the pipe such that the backup shoe units (98) are disengaged therefrom and thus, the position of the pipe clamping apparatus and the backup ring system (20) may be adjusted within the pipe.

As stated above, the front clamping mechanism (22) is also preferably capable of radial movement relative to the longitudinal axis of the shaft (40) between an extended position and a retracted position. Similarly, the rear clamping mechanism (24) is preferably capable of radial movement relative to the longitudinal axis of the shaft (40) between an extended position and a retracted position. Thus, in the extended positions, each of the front clamping mechanism (22), the rear clamping mechanism (24) and the backup ring assembly (44) are engaged with the interior surface of the pipe. In the retracted positions, each of the front clamping mechanism (22), the rear clamping mechanism (24) and the backup ring assembly (44) are disengaged from the interior surface.

Further, in the extended positions, the backup ring assembly (44) preferably extends radially at least as far from the longitudinal axis of the shaft (40) as do the clamping mechanisms (22,24) so that the backup shoe units (98) can engage the interior surface of the pipe. In the retracted positions, the front clamping mechanism (22), the rear clamping mechanism (24) and the backup ring assembly (44) may have any relative positions to each other, and in particular, may each be any desired distance from the longitudinal axis of the shaft (40).

However, preferably, when each of the front clamping mechanism (22), the rear clamping mechanism (24) and the backup ring assembly (44) are in their retracted positions, at least the front clamping mechanism (22) extends further from the longitudinal axis of the shaft than does the backup ring assembly (44), and in particular, the backup shoe units (98). In other words, the backup shoe units (98) are retracted to a position radially inward of the front clamping mechanism (22). In the preferred embodiment, in the retracted positions, both the front clamping mechanism (22) and the rear clamping mechanism (24) extend further from the longitudinal axis of the shaft (40) than does the backup ring assembly (44), and in particular, the backup shoe units (98). Thus, the backup shoe units (98) are retracted to a position radially inward of both of the front and rear clamping mechanisms (22,24).

These relative retracted positions are preferred in order to provide protection to the backup ring assembly (44) during movement of the pipe clamping apparatus and during the placement of the pipe sections about the pipe clamping apparatus for welding. For instance, the risk of impacting the backup shoe units (98) during the placement of the front pipe section about the front clamping mechanism (22) is lessened.

The radial distance of travel of the backup ring assembly (44) between the extended and retracted positions is therefore preferably greater than the radial distance of travel of either of the clamping mechanisms (22,24) between these positions, which is a function of the amount of reciprocation of the actuator (46) between these positions and the rate at which this reciprocation or longitudinal movement is converted to radial movement of the backup shoe units (98) by the actuator (46), as described further below.

As stated, the backup ring system (20), including the actuation system (42) and the backup ring assembly (44), is mounted between the front and rear clamping mechanisms (22, 24) as shown in FIG. 1. Preferably, the actuation system (42) is firther comprised of an alignment plate (100) disposed in a plane which is substantially perpendicular to the longitudinal axis of the shaft (40). The alignment plate (100) is fixedly mounted about the shaft (40) such that the shaft (40) extends therethrough.

The alignment plate (100) may be mounted about the shaft (40) in any manner and by any mounting mechanism fixing or maintaining the position of the alignment plate (100) longitudinally relative to the longitudinal axis of the shaft (40). In other words, the alignment plate (100) is not longitudinally movable or reciprocable along the shaft (40). Further, it is preferable that the alignment plate (100) is also mounted or fixed with the shaft (40) in a manner and by a mounting mechanism further inhibiting the rotational movement of the alignment plate (100) relative to the shaft (40). Thus, in the preferred embodiment, the alignment plate (100) is both rotationally and longitudinally fixedly mounted about the shaft (40). In other words, the alignment plate (100) facilitates or assists with the retention or maintenance of the position, both rotationally and longitudinally, of the shaft (40) and the other components affixed to the shaft (40) within the backup ling system (20).

In particular, in the preferred embodiment, the alignment plate (100) has an outer perimeter (102) and further defines an aperture (104) extending therethrough for the passage of the shaft (40). Preferably, the aperture (104) is substantially centrally located within the alignment plate (100) relative to the perimeter (102). The aperture (104) may be either permanently or removably fixedly mounted with the adjacent surface of the shaft (40). For instance, the alignment plate (100) may be integrally formed with the shaft (40) or may be permanently mounted thereto such as by welding. However, preferably, the alignment plate (100) is detachably or removably mounted about the shaft (40) for ease of assembly and maintenance.

The alignment plate (100) is mounted about the shaft (40) adjacent one end of travel of the actuator (46) thereon in either the first direction or the second direction. In the preferred embodiment, as shown in FIG. 2, the alignment plate (100) is mounted at the end of travel of the actuator (46) in the second direction.

Figure 6:
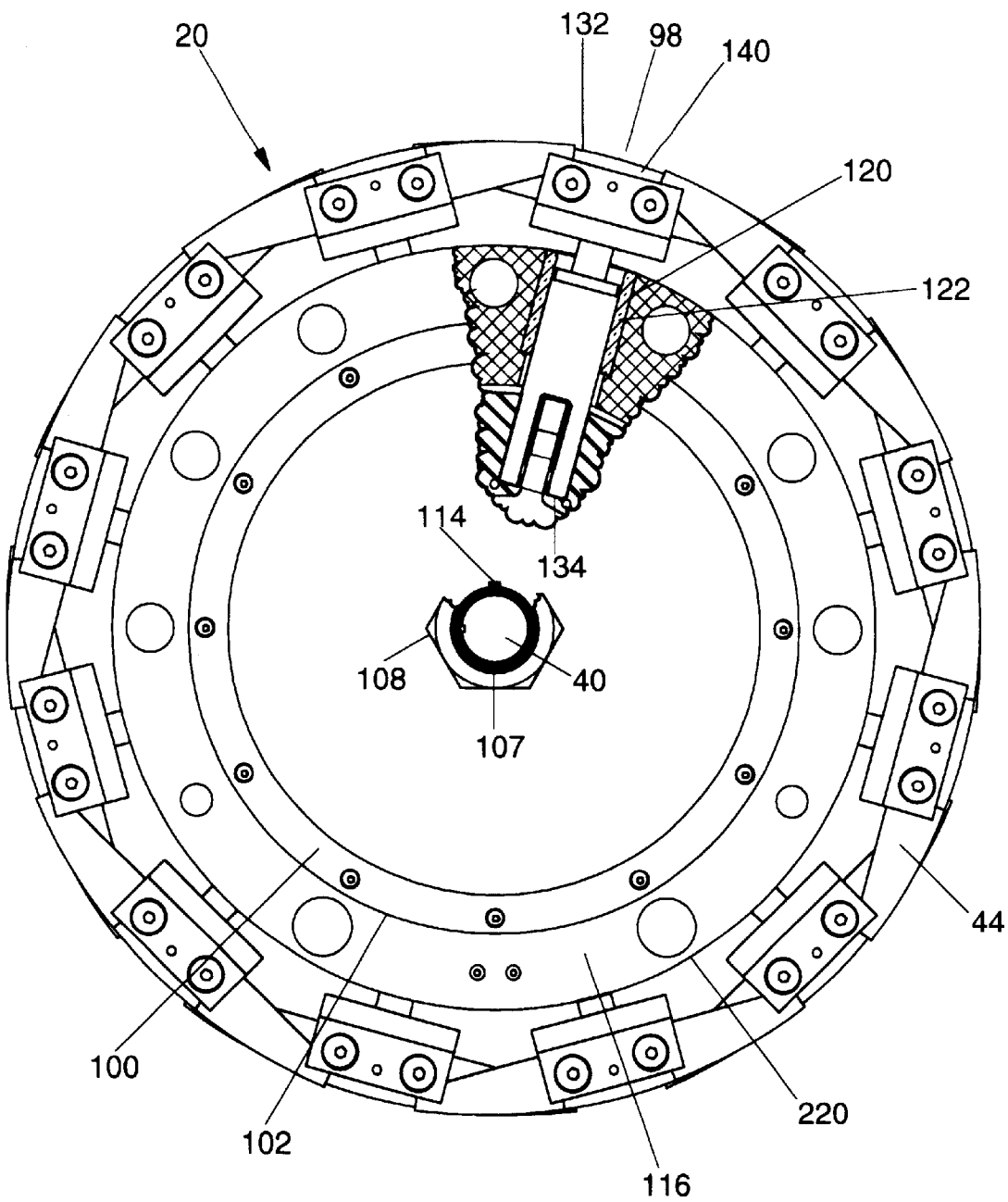
FIG. 6 is a front view of the actuation system and backup ring assembly shown in FIG. 2.
Figure 10:
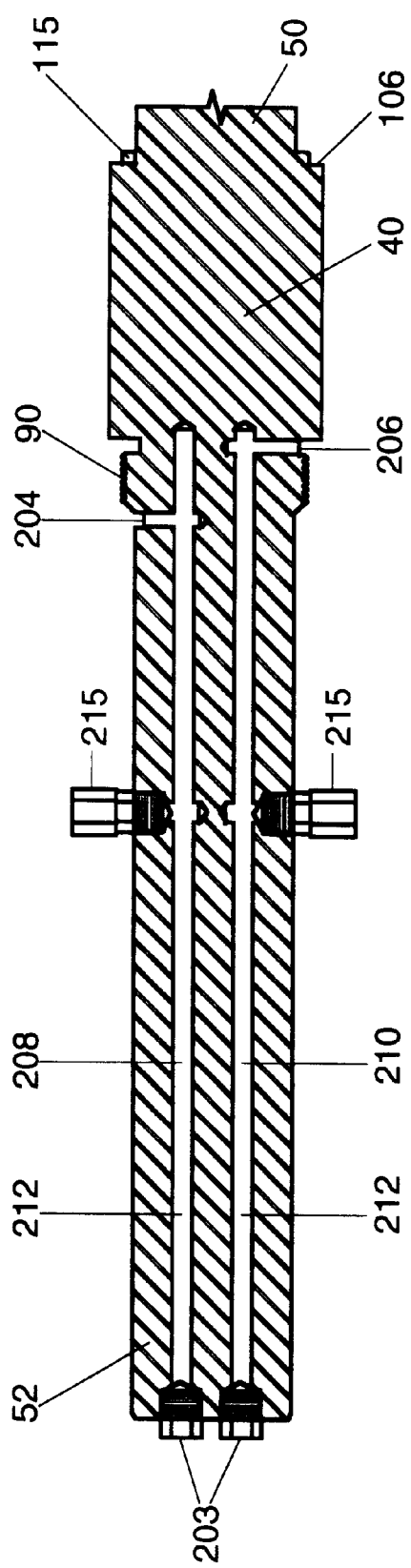
FIG. 10 is a longitudinal sectional view of the shaft of the actuation system shown in FIG. 2.

In the preferred embodiment, referring to FIGS. 2, 6 and 10, the shaft (40) defines a shoulder (106) thereon for abutment of the alignment plate (100) such that longitudinal movement of the alignment plate (100) along the shaft (40) in the first direction is prevented. Longitudinal movement of the alignment plate (100) along the shaft (40) in the second direction is prevented by the attachment of a retaining ring (107) and a fastener (108), such as a hex nut, about the shaft (40) to abut against the opposed side of the alignment plate (100). Specifically, an inner surface (110) of the hex nut (108) threadably engages a compatible threaded outer surface (112) of the shaft (40). Further, the alignment plate (100) is rotationally fixed with the shaft (40) by at least one key (114) extending between compatible keyways (113, 115) defined by the alignment plate (100) and the adjacent shaft (40) respectively.

The alignment plate (100) may have any shape or configuration compatible with its mounting in the pipe clamping apparatus. However, preferably, the alignment plate (100) is cylindrical or disc shaped such that the alignment plate (100) has a cylindrical perimeter (102). In addition, referring to FIGS. 1–2 and 5–6, the alignment plate (100) is preferably comprised of a guide ring (116). The guide ring (116) extends about the perimeter (102) of the alignment plate (100) in a plane substantially perpendicular to the plane of the alignment plate (100) in a direction towards the actuator (46). As a result, the guide ring (116) defines an actuator housing (118). Accordingly, the alignment plate (100) including the guide ring (116) are of sufficient dimensions to permit the actuator (46) to be contained within the actuator housing (118), preferably throughout the length of its travel along the shaft (40). The guide ring (116) may be integrally formed with the perimeter (102) of the alignment plate (100). However, preferably, the guide ring (116) is comprised of a separate or distinct unit which is either permanently or removably affixed to, or otherwise held in position about, the perimeter (102).

The backup ring assembly (44) is associated with actuator (46), as described further below, such that reciprocation of the actuator (46) causes the backup ring assembly (44), and more particularly the backup shoe units (98), to move radially relative to the longitudinal axis of the shaft (40). In order for the actuator (46) to actuate the backup shoe units (98) in this manner, and in order for the backup shoe units (98) to engage the interior surface of the pipe in the extended position, the backup shoe units (98) must pass or extend through the guide ring (116). Thus, in the preferred embodiment, the guide ring (116) defines a plurality of sleeves (120) therethrough for receiving the plurality of backup shoe units (98), as shown in FIGS. 1 and 2. In the preferred embodiment, each sleeve (120) includes a bushing (122) therein.

The backup ring assembly (44), comprising the plurality of backup shoe units (98), may be associated with the actuator (46) by any structure or mechanism or in any manner permitting the radial movement of the backup shoe units (98) in response to the reciprocation of the actuator (46). For instance, the actuator (46) and the backup shoe units (98) may be connected or linked by toggle links as described above for the front and rear spider linkage assemblies (28, 34). However, preferably, the backup ring assembly (44) is associated with the actuator (46) such that reciprocation of the actuator (46) produces a camming action on the backup shoe units (98) resulting in the radial movement of the backup shoe units (98).

Specifically, in the preferred embodiment, the actuator (46) comprises at least one camming surface (124), and preferably a plurality of camming surfaces (124). The backup ring assembly (44) and particularly the backup shoe units (98) engage the camming surfaces (124) so that reciprocation of the actuator (46) along the shaft (40) causes the backup shoe units (98) to move radially relative to the longitudinal axis of the shaft (40) by moving along the camming surfaces (124). Referring to FIGS. 2–4, the camming surfaces (124) are preferably positioned or circumferentially spaced about the outer perimeter (62) of the actuator (46). Further, the camming surfaces (124) are configured to provide the desired amount of radial movement of the backup shoe units (98). In the preferred embodiment, a camming surface (124) is associated with each backup shoe unit (98). However, any alternate configuration resulting in the required camming action may be used.

The camming surfaces (124) may have any configuration and may be formed in the actuator (46) in any manner resulting in the required camming action. The particular location or position of the camming surfaces (124) is determined, at least in part, by the size or diameter of the actuator (46). In the preferred embodiment, as shown in FIG. 3, the camming surfaces (124) are positioned in the actuator (46) such they are radially spaced apart from the actuator chamber (54). However, alternately as shown in FIG. 4, the camming surfaces (124) may be longitudinally spaced apart from the actuator chamber (54). As well, the specific slope, shape and configuration of the camming surfaces (124) is also dependent upon the available length or amount of travel of the actuator (46) along the shaft (40). For instance, as the amount of travel increases, the slope or inclination of the camming surface (124) necessary to move the backup shoe units (98) to the extended position tends to decrease.

Further, each of the camming surfaces (124) is preferably comprised of a camming slot (126) having an innermost end (128) and an outermost end (130). The innermost end (128) is located nearer the longitudinal axis of the shaft (40) than the outermost end (130). As the backup shoe unit (98) moves along the camming surface (124), within the camming slot (126), towards the innermost end (128), the backup shoe unit (98) is moved towards the retracted position. The outermost end (130) of the camming slot (126) is located adjacent the outer perimeter (62) of the actuator (46). As the backup shoe unit (98) moves along the camming surface (124), within the camming slot (126), towards the outermost end (130), the backup shoe unit (98) is moved towards the extended position. The camming slot (126) may be configured to permit any amount of radial travel between the extended and retracted positions. As previously described, the amount of radial travel is a function of both the amount of reciprocation of the actuator (46) between the extended and retracted positions and the rate at which this reciprocation is converted to radial movement. By varying the length of the camming surfaces (124) as well as the amount of reciprocation of the actuator (46), or by varying the shape or slope of the camming slots (126), the radial travel of the backup shoe units (98) may be altered in order to achieve the desired amount of travel.

In the preferred embodiment, the outermost end (130) of the camming slot (126) is open, in that the slot (130) extends to the outer perimeter (62) of the actuator (46), in order that the backup shoe unit (98) may be readily removed from the camming slot (126) in the event that replacement or repair of the backup shoe unit (98) is required. However, where the outermost end (130) is open, there is a risk that the backup shoe unit (98) may unintentionally pass out of the camming slot (126) through the open outermost end (130) if the backup shoe unit (98) is extended when the pipe clamping apparatus is not positioned inside a pipe so that the backup shoe unit (98) is restrained from excessive outward radial movement by the interior surface of the pipe. As a result, the outermost end (130) of the camming slot (126) may be closed by either a permanent or a removable structure or mechanism. Alternately, where it is desired that the outermost end (130) remain open, other features or mechanisms are preferably provided, as described below for the preferred embodiment of the invention, for restraining or maintaining the backup shoe unit (98) within the camming slot (126) during use of the backup ring system (20).

Any type of backup shoe unit (98) compatible with the actuator (46) and capable of radial movement in response to the reciprocation thereof, may be used. However, preferably, each backup shoe unit (98) has an outer end (132) and an inner end (134). The outer end (132) of the backup shoe unit (98) is configured for engaging the interior surface of the pipe in the extended position of the backup shoe unit (98). The inner end (134) of the backup shoe unit (98) is configured for engaging the camming surface (124) of the actuator (46).

In addition, each backup shoe unit (98) is preferably capable of a limited range of radial movement between an inner limit and an outer limit without reciprocation of the actuator (46). The backup shoe units (98) may comprise any structure or elements permitting the limited range of radial movement. Further, the backup shoe units (98) preferably comprise an urging mechanism for urging the backup shoe units (98) toward the outer limit of the limited range of radial movement. Any urging mechanism or device, such as a spring, may be used. However, the preferred mechanism for providing the limited range of radial movement and the preferred urging mechanism are described in detail below.

Figure 7:
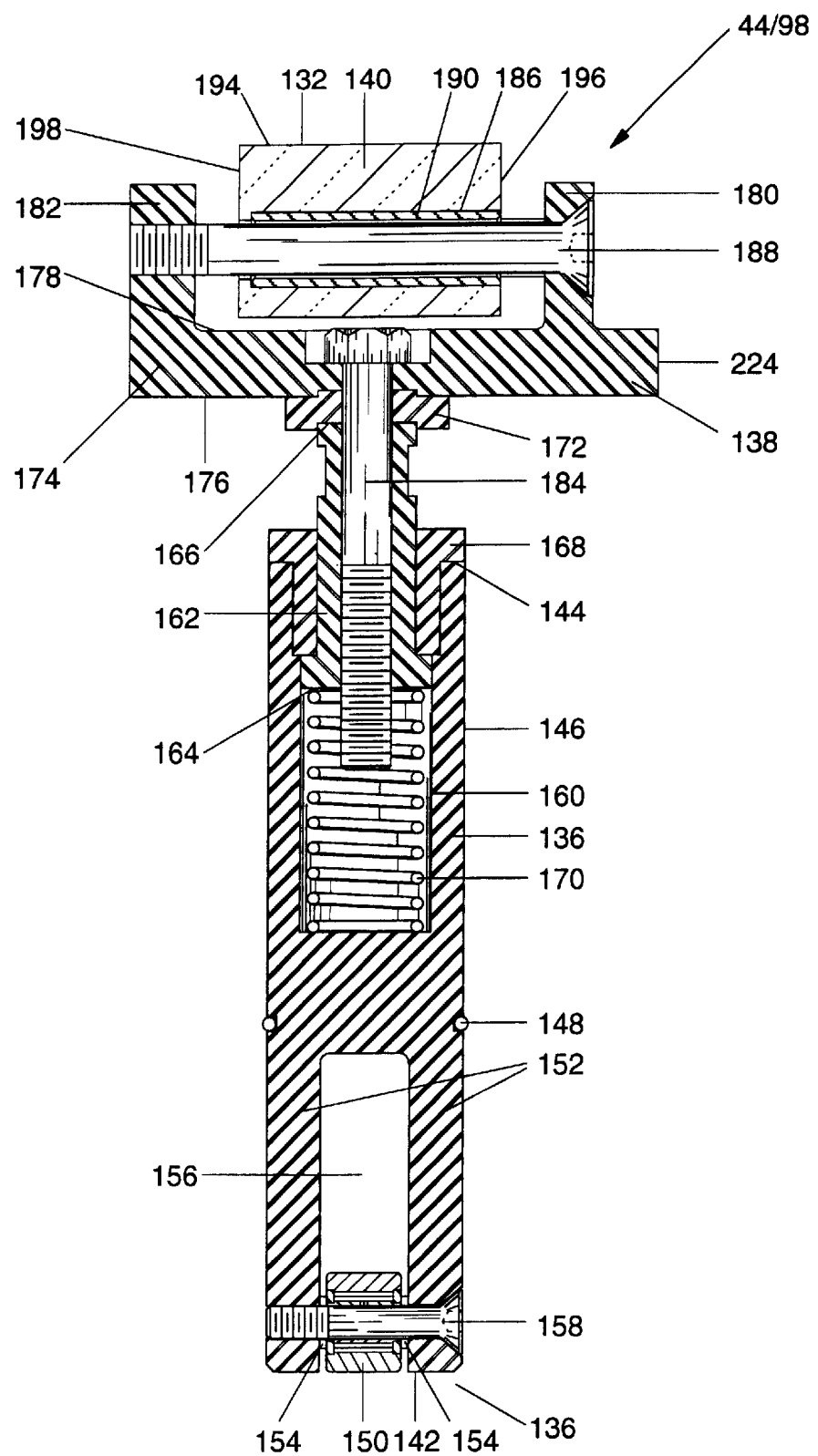
FIG. 7 is a side sectional view of the backup shoe unit shown in FIGS. 1 and 2.
Figure 9:
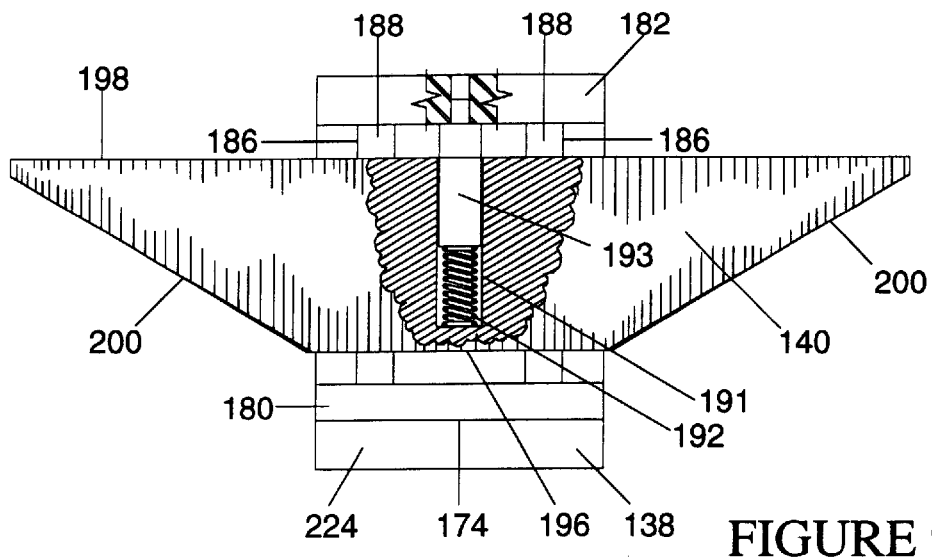
FIG. 9 is a top view of the backup shoe unit shown in FIG. 7.
Figure 8:
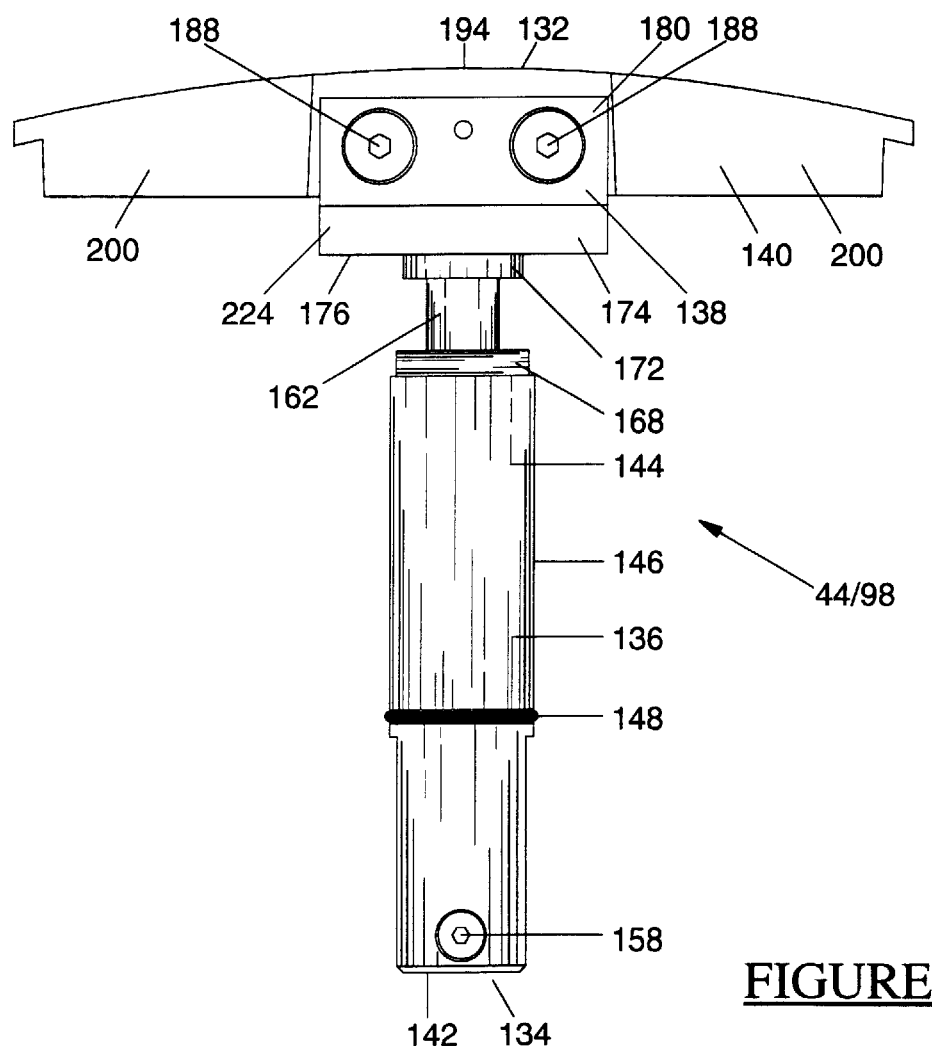
FIG. 8 is a front view of the backup shoe unit shown in FIG. 7.

Referring to FIGS. 7–9, in the preferred embodiment, each backup shoe unit (98) is comprised of a shoe deployment rod (136), a shoe carrier (138) mounted or connected with the shoe deployment rod (136) and a backup shoe (140) carried by or mounted with the shoe carrier (138). The shoe deployment rod (136) has an inner end (142), defining the inner end (142) of the backup shoe unit (98), an opposing outer end (144), a longitudinal axis extending therebetween and an outer surface (146). The inner end (142) is associated with the actuator (46) for actuation of the shoe backup unit (98), while the outer end (144) is associated with the shoe carrier (138) for the support thereof. Preferably, the inner end (142) of the shoe deployment rod (136) is associated with the actuator (46) in a manner such that the longitudinal axis of the shoe deployment rod (136) is substantially perpendicular to the longitudinal axis of the shaft (40).

Further, the shoe deployment rod (136) is configured for passage through the sleeve (120) defined by the guide ring (116). Specifically, the outer surface (146) of the shoe deployment rod (136) is in sliding contact with the bushing (122) contained within the sleeve (120). Where desired, a releasable retainer such as one or more O-rings (148) may be located on the outer surface (146) of the rod (136) to inhibit the rod (136) from falling out of the sleeve (120) when the backup shoe unit (98) is in the extended position and the pipe clamping apparatus is not positioned in a pipe. Accordingly, the actuator (46), actuating the shoe deployment rod (136), is contained within the actuator housing (118) defined by the guide ring (116), while the shoe carrier (138) and backup shoe (140) are positioned outside the actuator housing (118) in both the extended and retracted positions of the backup shoe units (98).

More particularly, referring to FIGS. 7–9, the inner end (142) of the shoe deployment rod (136) comprises a cam follower (150) compatible with the camming surface (124) or camming slot (126). Any compatible cam follower (150) may be used. In the preferred embodiment, the inner end (142) of the shoe deployment rod (136) includes two prongs (152) defining a gap (156) therebetween. The cam follower (150), being any suitable roller, is rotatably mounted on a suitable bearing or bushing substantially perpendicular to the longitudinal axis of the shoe deployment rod (136) in the gap (156) between the prongs (152) by a fastener such as a screw (158). Spacers (154) may be provided between the ends of the cam follower (150) and the prongs (152) to contain the bearings or bushings and facilitate tightening of the screw (158) without binding the cam follower (150).

However, the configuration of the cam follower (150) may be varied, particularly where required for use in smaller diameter pipes. For instance, the inner end (142) of the shoe deployment rod (136) may include a single, central prong (not shown). In this case, the cam follower (150) may be comprised or two rollers (not shown) rotatably mounted on opposed sides of the central prong substantially perpendicular to the longitudinal axis of the shoe deployment rod (136).

Further, the shoe deployment rod (136) defines a bore (160), which extends to the outer end (144) of the rod (136), for accommodating at least a portion of a biasing plunger (162) therein. In particular, the biasing plunger (162) has an inner end (164), which is movably mounted or contained within the bore (160) of the shoe deployment rod (136), and an opposing outer end (166) extending from the outer end (144) of the shoe deployment rod (136) for connection with the shoe carrier (138). The biasing plunger (162) is mounted or contained within the bore (160), in a manner permitting the reciprocation therein, by a retainer cap (168) positioned about the biasing plunger (162) at the outer end (144) of the shoe deployment rod (136). However, any mechanism for maintaining or retaining the biasing plunger (162) in association with the shoe deployment rod (136) in a manner permitting the reciprocation of the plunger (162) within the bore (160) may be used.

The biasing plunger (162) is provided for facilitating the connection or mounting of the outer end (144) of the rod (136) with the shoe carrier (138) such that actuation of the shoe deployment rod (136) actuates the backup shoe (140) connected with the shoe carrier (138). Further, as stated, each backup shoe unit (98) is preferably capable of a limited range of radial movement between an inner limit and an outer limit without reciprocation of the actuator (46). The biasing plunger (162) provides for this limited range of radial movement. Specifically, reciprocation of the biasing plunger (162) within the bore (160) of the shoe deployment rod (136) permits the backup shoe (140), connected with the shoe carrier (138), to move between the inner limit and the outer limit. At the outer limit, the inner end (164) of the biasing plunger (162) preferably engages the retainer cap (168).

This limited range of radial movement assists in establishing positive contact between the backup shoe units (98) and the interior surface of the pipe. One reason for this is that the radial travel of the backup shoe units (98) is preferably designed so that the backup shoe units (98) will extend further from the longitudinal axis of the shaft (40) than the clamping mechanisms (22,24) when all are in the extended position, with the result that the biasing plunger (162) will be depressed by the interior surface of the pipe to provide a biased engagement of the backup shoe unit (98) with the pipe. A second reason for this is that the limited range of radial movement will permit the backup ring assembly (44) to adjust to the interior surfaces of pipes which are not perfectly round or which have other imperfections.

Thus, upon reciprocation of the actuator (46) in the second direction to move the backup shoe units (98) towards the retracted position, the shoe deployment rod (136) is moved radially inwards until the inner end (164) of the biasing plunger (162) engages the retainer cap (168). Thereafter, firther reciprocation in the second direction will cause the retainer cap (168) to act upon the biasing plunger (162) and cause the backup shoe (140) to be moved radially inward towards the retracted position.

Further, as stated, the backup shoe units (98) preferably comprise an urging mechanism for urging the backup shoe units (98) toward the outer limit of the limited range of radial movement. In the preferred embodiment, the urging mechanism is associated with the biasing plunger (162) for biasing or urging the plunger (162) to move within the bore (160) outwardly or radially in a direction towards the outer end (144) of the shoe deployment rod (136). Although any urging mechanism may be used, the urging mechanism is preferably comprised of a radial biasing spring (170) positioned within the bore (160) in communication with the inner end (164) of the biasing plunger (162).

Where desired, the outer limit of the limited range of radial movement of the backup shoe units (98) may be varied or altered to either increase or decrease the outer limit. For instance, as shown in FIG. 7, one or more shims (172) may be inserted at the outer end (166) of the biasing plunger (162) between the plunger (162) and the shoe carrier (138) in order to increase the outer limit of the backup shoe unit (98). Alternately, one or more modified shims (172) may be inserted between the inner end (164) of the biasing plunger (162) and the adjacent retainer cap (168) in order to decrease the outer limit of the backup shoe unit (98). However, the length of the plunger (162) may also be increased in any other manner to increase the outer limit, or conversely the length of the plunger (162) may be decreased in any manner to decrease the outer limit.

There are two primary purposes for using shims (172). First, shims (172) may be inserted in each backup shoe unit (98) to adapt the backup ring assembly (44) for use with different sizes of pipe. Second, varying numbers or sizes of shims (172) may be inserted in the backup shoe units (98) to vary the limited range of radial movement of the backup shoe units (98) so that reciprocation of the actuator (46) in the second direction causes the backup shoe units (98) to move radially inward in a desired sequence, thus resulting in a zippering effect of the backup shoe units (98).

Any type of shoe carrier (138) compatible with the particular backup shoe (140) and compatible with the operation of the backup shoe unit (98) as described herein may be used. Preferably, the shoe carrier (138) is comprised of a U-shaped carrier member (174) having a lower surface (176), an upper surface (178) and front and rear arms (180, 182) extending from the upper surface (178) forming the U-shape. The carrier member (174) is associated with the shoe deployment rod (136). Preferably, the lower surface (176) of the carrier member (174) is mounted or connected with the outer end (166) of the biasing plunger (162), or any shims (172) connected thereto. However, the carrier member (174) and the biasing plunger (162) may be connected in any other operable manner. Further, the lower surface (176) of the carrier member (174) may be integrally formed with the outer end (166) of the biasing plunger (162) and any shims (172). However, preferably, the lower surface (176) of the carrier member (174) is connected or mounted thereto using a fastener or method for fastening adjacent surfaces. In the preferred embodiment, the lower surface (176) is mounted with the outer end (166) of the biasing plunger (162), and any intervening shims (172), by a fastener, such as a bolt (184) extending from the lower surface (176) of the carrier member (174) into the biasing plunger (162).

The backup shoe (140) may be connected or mounted with the shoe carrier (138) in any manner and by any connectors, fasteners or connection or fastening methods or processes which are compatible with the operation of the backup shoe unit (98) as described herein. However, preferably, the backup shoe (140) is connected or mounted adjacent the upper surface (178) of the carrier member (174) such that it is received or partially contained within the arms (180, 182) of the carrier member (174) forming the U-shape. Preferably the backup shoe (140) is movably mounted between the arms (180, 182) such that an amount of axial movement of the backup shoe (140) between the arms (180, 182) is permitted. Thus, the backup shoe (140) is movable in a radial direction, between the extended and retracted positions of the backup shoe unit (98), as a result of the actuator (46). Further, the backup shoe (140) is preferably movable in an axial direction substantially perpendicular to the longitudinal axis of the shoe deployment rod (136).

In the preferred embodiment, each backup shoe (140) defines one or more passages (186) therethrough for the mounting of the backup shoe (140) between the arms (180, 182) of the carrier member (174). The backup shoe (140) is positioned, at least in part, within the U-shape formed by the arms (180, 182) of the carrier member (174) adjacent the upper surface (178). A fastener such as a screw (188) extends between the arms (180, 182) through one or more of the passages (186) defined by the backup shoe (140). The backup shoe (140) is reciprocally movable on the screws (188) in the axial direction. In order to facilitate the axial movement, each passage (186) may include a bushing (190) therein.

Further, the backup shoe (140) is preferably biased or urged axially toward one of the arms (180, 182) of the carrier member (174). Any biasing or urging mechanism may be used. However, in the preferred embodiment as shown in FIG. 9, the backup shoe (140) further defines a cavity (191) extending from within the backup shoe (140) towards one of the arms (180, 182). An axial biasing spring (192) is positioned within the cavity (191), which acts upon an axial biasing pin (193). More particularly, the axial biasing spring (192) acts upon an inner end of the axial biasing pin (193) to urge the pin (193) out of the cavity (191). An outer end of the axial biasing pin (193) extends from the cavity (191) for engagement with one of the arms (180, 182).

The axial biasing springs (192) in conjunction with the axial biasing pins (193) are intended to urge the adjacent ends of the backup shoes (140) in each adjacent backup shoe unit (98) towards each other when the backup ring system (20) is assembled and positioned for use in the pipe clamping apparatus. Thus, in the preferred embodiment, the axial biasing pins (193) alternately act upon or engage the front arm (180) and the rear arm (182) of the carrier member (174).

The backup shoe (140) may have any shape or configuration compatible with the operation of the backup shoe unit (98) as described herein and compatible with the interior surface of the pipe to be welded. Specifically, each backup shoe (140) is configured such that the backup shoes (140) may be arranged circumferentially to form the backup ring assembly (44) and to provide a substantially continuous outer surface at various diameters of the backup ring assembly (44). Further, the backup shoe (140) configuration is compatible with the interior surface of the pipe to be welded such that each of the backup shoes (140) may engage the interior surface when the backup shoe units (98) are moved radially outward to the extended position. The configuration of each backup shoe (140) also permits the backup shoe units (98) to be moved radially inwards towards the retracted position.

In the preferred embodiment, when viewed from the front, as shown in FIG. 8, the backup shoe (140) has an arcuate outer surface (194) for engaging the interior surface of the pipe. The outer surface (194) defines the outer end (132) of the backup shoe unit (98). Thus, the specific shape of the outer surface (194) and the degree of the arc formed thereby are compatible with the pipe to be welded. Further, when viewed from the top, as shown in FIG. 9, the backup shoe (140) forms a trapezoid having a shorter axial side (196) and a parallel longer axial side (198) and having non-parallel end sides (200) extending therebetween. Preferably, the end sides (200) are equal and opposite such that the backup shoe (140) forms an isosceles trapezoid when viewed from the top. The backup shoes (140) are arranged in the backup ring assembly (44) to face in opposite directions. In other words, in the backup shoe (140) shown in FIG. 9, the longer axial side (198) faces forwards towards the front of the pipe clamping apparatus. The longer axial sides (198) of the backup shoes (140) adjacent to the backup shoe (140) shown in FIG. 9 face rearwards towards the rear of the pipe clamping apparatus. The direction of the longer axial side (198) is alternated between adjacent backup shoes (140) throughout the backup ring assembly (44) so that the adjacent end sides (200) of adjacent backup shoes (140) may slidingly engage each other.

Each backup shoe (140) may be comprised of any material or combination of materials compatible with its use as a backup surface for the welding of the adjacent ends of the pipe, including metals, ceramics and composite materials. Preferably, at least the outer surface (194) of the backup shoe (140) is comprised of copper. In the preferred embodiment, the entire backup shoe (140) is comprised of solid copper.

The actuation system (42) is also preferably further comprised of a fluid feed mechanism (202). The fluid feed mechanism (202) may be hydraulic or pneumatic and is associated with at least one of the first and second chambers (92, 94) for communicating a pressurized fluid thereto in order to provide a differential force between the chambers (92, 94) as discussed above. In the preferred embodiment, the fluid feed mechanism (202) is associated with each of the first and second chambers (92, 94) for communicating a first pressurized fluid with the first chamber (92) and a second pressurized fluid with the second chamber (94). In this instance, the first and second pressurized fluids provide the differential force to reciprocate the actuator (46). The fluid feed mechanism (202) includes a fluid source (not shown). The fluid provided by the fluid source may be any compatible gas or liquid. Thus, the fluid feed mechanism (202) may be either hydraulic or pneumatic. However, as conventional pipe clamping apparatuses typically include an air tank or other air source for driving the front and rear clamping mechanisms (22, 24), the fluid feed mechanism (202) is preferably pneumatic.

In addition, in order that the backup shoe units (98) may be selectively moved between the extended and retracted positions, the fluid feed mechanism (202) preferably selectively communicates the first and second pressurized fluids to the first and second chambers (92, 94) respectively to selectively cause reciprocation in the first and second directions. Any mechanism capable of selectively communicating the pressurized fluid as described may be used. Further, the fluid feed mechanism (202) may be associated with, and extend through or to, the actuator housing (118), the actuator (46) and the shaft (40) in any manner permitting the pressurized fluid to communicate with the chambers (92, 94), while still permitting the functioning of the actuation system (44).

In the preferred embodiment, the fluid feed mechanism (202) is comprised of a first fluid port (204) and a second fluid port (206). The first fluid port (204) is associated with the first chamber (92) such that the first pressurized fluid may be supplied or provided thereto to cause the actuator (46) to reciprocate along the shaft (40) in the first direction. Specifically, the actuator (46) will reciprocate in the first direction when the first pressurized fluid provides a longitudinal force in the first direction greater than the longitudinal force in the second direction provided by the second pressurized fluid. In addition to supplying or providing the first pressurized fluid, the first port (204) also provides for or permits the venting of the first pressurized fluid from the first chamber (92) as necessary to permit the actuator (46) to move in the second direction. Finally, the first fluid port (204) is comprised of one or more apertures as required to permit or provide for an effective passage of the first pressurized fluid therethrough.

The second fluid port (206) is associated with the second chamber (94) such that the second pressurized fluid may be supplied or provided thereto to cause the actuator (46) to reciprocate along the shaft (40) in the second direction. Specifically, the actuator (46) will reciprocate in the second direction when the second pressurized fluid provides a longitudinal force in the second direction greater than the longitudinal force in the first direction provided by the first pressurized fluid. In addition to supplying or providing the second pressurized fluid, the second port (206) also provides for or permits the venting of the second pressurized fluid from the second chamber (94) as necessary to permit the actuator (46) to move in the first direction. Finally, the second fluid port (206) is comprised of one or more apertures as required to permit or provide for an effective passage of the second pressurized fluid therethrough.

In the preferred embodiment, the fluid feed mechanism (202) is further comprised of a first fluid conduit (208) for conducting the first pressurized fluid therethrough to and from the first fluid port (204). Similarly, the fluid feed mechanism (202) is comprised of a second fluid conduit (210) for conducting the second pressurized fluid therethrough to and from the second fluid port (206). Each of the conduits (208, 210) preferably extends from the fluid source, such as an air tank, to the respective first and second fluid ports (204, 206). In this regard, each of the fluid conduits (208, 210) may extend or pass through any portion of the pipe clamping apparatus including the front and rear clamping mechanisms (22, 24) and the backup ring system (20) including the actuation system (42) so long as the conduits (208, 210) do not interfere with the functioning of the pipe clamping apparatus.

In the preferred embodiment as shown in FIGS. 2, 5, 6 and 10, with respect to the location or position of the fluid conduits (208, 210) in the actuation system (42), the first and second fluid conduits (208, 210) are each comprised of a first leg or portion (212) which extends through the shaft (40) for communication with the first and second fluid ports (204, 206). The first leg (212) of the first fluid conduit (208) extends through the shaft (40) to the first fluid port (204), while the first leg (212) of the second fluid conduit (210) extends through the shaft (40) to the second fluid port (206). Each of the first legs (212) is preferably comprised of a passage or orifice defined by the shaft (40) and extending at least partly longitudinally therethrough. In the preferred embodiment, each of the first legs (212) extends from or to the rear end (52) of the shaft (40) for ease of manufacture. However, each of the first legs (212) is preferably plugged or otherwise closed adjacent the rear end (52) of the shaft (40) by a plug (203) or other closure device.

The first and second fluid conduits (208, 210) are each further comprised of a second leg or portion (214) which extends from the shaft (40) for communication with the first leg (212) to the actuator housing (118) and particularly, to the guide ring (116). Each of the second legs (214) is preferably comprised of a tube or tubing, preferably stainless steel, which is connected at its ends to the other legs or portions of the fluid conduits (208, 210) by a fitting or fittings (215). In this case, as described above, the shaft (40) is preferably longitudinally and rotationally fixed with the alignment plate (100) to retain or fix the position of the shaft (40) within the actuator housing (118) and thus prevent or minimize any unnecessary stress on the tubing.

Finally, the first and second fluid conduits (208, 210) are each further comprised of a third leg or portion (216) which extends from the second leg (214) and passes through the actuator housing (118), and in particular, passes through the guide ring (116). Each of the third legs (216) is comprised of at least one passage defined by the guide ring (116) for conducting the pressurized fluid therethrough from the fluid source to the second legs (214). The guide ring (116) preferably has an inner surface (218), an opposing outer surface (220) and two opposing side surfaces (222) adjacent the front and rear clamping mechanisms (22, 24). Each third leg (216) preferably extends from the inner surface (218) of the guide flange (116), where it is connected with the second leg (214) by a fitting (215), to at least one of the outer surface (220) or one or both of the side surfaces (222). The specific design and configuration of the first and second fluid conduits (208, 210), including each of the first, second and third legs (212, 214, 216) will be dependent upon, amongst other factors, the type and location of the fluid source and the overall design of the pipe clamping apparatus.

In addition, the backup ring system (20) may also include an auxiliary mechanism for dislodging the backup ring assembly (44) when at least one of the backup shoe units (98) is stuck to the interior surface of the pipe in the extended position. The auxiliary mechanism is primarily for use when the reciprocation of the actuator (46) in the second direction is insufficient on its own to dislodge or retract the backup shoe units (98). Any mechanism, structure, device or method capable of dislodging the backup ring assembly (44) may be used as the auxiliary mechanism.

For instance, the outer limit of the limited range of radial movement of the backup shoe units (98) may be varied in order to achieve a zippering effect. As a result of the variation of the outer limit of the limited range of radial movement of the backup shoe units (98), reciprocation of the actuator (46) in the second direction causes the backup shoe units (98) to move radially inward sequentially toward the retracted position as the backup shoe units (98) sequentially reach their respective outer limits of the limited range of radial movement. The outer limit of the limited range of radial movement may be varied in any manner. For instance, the length of the plunger (162) may be increased or decreased. Preferably, the outer limit is varied by inserting one or more shims (172) in the backup shoe units (98). The sequential retraction of the backup shoe units (98) results in the retraction force generated by the reciprocation of the actuator (46) in the second direction being applied to a limited number of backup shoe units (98) concurrently. Backup shoe units (98) with the least range of radial movement or with the smallest outer limit will be retracted first upon the reciprocation of the actuator (46) in the second direction, while backup shoe units (98) with the most range of radial movement or the greatest outer limit will be retracted last. Thus, the pattern of retraction within the backup ring assembly (44), and the number of backup shoe units (98) to be retracted concurrently, may be selected or designed as desired by selecting the size or number of shims to be inserted in any particular backup shoe unit (98). In other words, the backup shoe units may be retracted sequentially either individually or in one or more groupings of backup shoe units. Further, each individual backup shoe unit or each grouping of backup shoe units may be retracted in any order or succession as compared with any other individual backup shoe unit or any other grouping of backup shoe units.

An alternative for creating a sequential retraction of the backup shoe units (98) and thus a zippering effect is to vary the configuration of the camming surfaces (124) on the actuator (46) so that the backup shoe units (98) reach the outer limit of their limited range of radial movement at different times during reciprocation of the actuator (46). This is preferably accomplished by varying the shape or slope of the camming surfaces (124).

However, in the preferred embodiment, the auxiliary dislodging mechanism is comprised of an engagement surface on at least one of the backup shoe units (98). The engagement surface may have any shape or configuration compatible with its intended function of dislodging the backup ring assembly (44). However, preferably, the engagement surface is comprised of at least one tab (224) associated with at least one of the backup shoe units (98), as shown in FIGS. 1, 2 and 7. Preferably, a tab (224) is associated with each of the backup shoe units (98) comprising the backup ring assembly (44). Further, the tab (224) may be comprised of any portion or element of the backup shoe unit (98) which may be engaged with the clamping mechanisms (22, 24). Preferably, the tab (224) is comprised of or associated with the shoe carrier (138) of the backup shoe unit (98), and in particular, the U-shaped carrier member (174). The tab (224) may be connected or mounted with the carrier member (174) in any manner, however preferably, the tab (224) is integral with the carrier member (174).

The engagement surface or tab (224) may engage either or both of the front or rear clamping mechanisms (22, 24). For instance, when the backup shoe unit (98) is not in the retracted position, the tab (224) may engage the rear clamping mechanism (24) in response to the inward radial movement of the rear clamping mechanism (24) in order to urge the backup shoe unit (98) radially inward toward the retracted position. In this case, the tab (224) is preferably associated with the rear arm (182) of the carrier member (174). In the preferred embodiment, when the backup shoe unit (98) is not in the retracted position, the tab (224) engages the front clamping mechanism (22) in response to the inward radial movement of the front clamping mechanism (22) in order to urge the backup shoe unit (98) radially inward toward the retracted position. In this case, the tab (224) is associated with the front arm (180) of the carrier member (174).

More particularly, the tab (224) is engaged by a corresponding compatible tab (226) associated with the adjacent surface of the front clamping mechanism (22). The compatible tab (226) may be comprised of any portion or element of the front clamping mechanism (22) which may be engaged with the tab (224). Preferably, the compatible tab (226) is comprised of or associated with the front clamping shoe unit (32). The compatible tab (226) may be connected or mounted with the front clamping shoe unit (32) in any manner, however preferably, the compatible tab (226) is integral with the front clamping shoe unit (32). As the compatible tab (226) of the front clamping mechanism (22) is retracted, it hammers down on or applies a retraction force to the tab (224) of the backup shoe unit (98).

Preferably, the tabs (224, 226) are configured such that they only engage upon the sticking of the backup shoe (140) to the interior surface of the pipe, thus acting as a fail safe mechanism. Further, the tabs (224, 226) are preferably configured so that the front clamping mechanism (22) engages the backup shoe unit (98) near the end of the range of movement of the front clamping mechanism (22), or near the end of its travel, towards its retracted position. As well, the tabs (224, 226) are configured such that the engagement of the tabs (224, 226) causes the backup shoe unit (98) to be moved towards its retracted position without causing any damage to the backup assembly (44) or the actuator (46). Finally, the tabs (224, 226) are preferably configured to restrain or maintain the backup shoe unit (98) within the camming slot (126) during use of the backup ring system (20).

In operation, the backup ring system (20), the front clamping mechanism (22) and the rear clamping mechanism (24) may be actuated to engage the interior surface of the pipe in any order or sequence. Similarly, the backup ring system (20), the front clamping mechanism (22) and the rear clamping mechanism (24) may be retracted from the interior surface in any order or sequence. This flexibility is possible, at least in part, as a result of the ability to actuate the actuation system (42) of the backup ring system (20) independently of the front and rear clamping mechanisms (22, 24). However, preferably, when engaging the interior surface of the pipe for the welding operation, the rear clamping mechanism (24) is extended first and then the front clamping mechanism (22). Finally, the backup ring assembly (44) is moved towards the extended position. To disengage the interior surface, the operation is reversed. First, the backup ring assembly (44) is moved towards the retracted position. The front and rear clamping mechanisms (22,24) may then be retracted in any desired order.

More particularly, in the preferred embodiment, the rear end of the pipe clamping apparatus is placed into the rear pipe section to be welded, with each of the backup ring assembly (44), the front clamping mechanism (22) and the rear clamping mechanism (24) in their retracted positions. The pipe clamping apparatus is then properly oriented in the pipe and the carrier wheel assemblies are engaged. The pipe clamping apparatus is then moved rearward into the rear pipe section by the clamp drive assembly until an axial alignment mechanism (not shown) engages the end of the pipe in order to align the backup ring assembly (44) with the end of the rear pipe section.

The rear clamping shoe units (38) of the rear clamping mechanism (24) are then moved to the extended position. The front pipe section to be welded is placed over the front end of the pipe clamping apparatus about the nose guide until the front pipe section abuts against the rear pipe section. The front and rear pipe sections are preferably spaced a desired distance apart to form a gap for the welding operation. Once the desired spacing is achieved, the front clamping shoe units (32) of the front clamping mechanism (22) are moved to the extended position. The backup ring assembly (44) is moved towards the extended position once the front and rear clamping shoes are engaged with the interior surface. Once in the extended position, the adjacent pipe sections are welded.

Upon completion of the welding operation, the backup ring assembly (44) is moved towards the retracted position. Both the front and rear clamping shoes of the front and rear clamping mechanisms (22, 24) are then also moved towards the retracted position away from the interior surface of the pipe. Where necessary, the tabs (224, 226) on the backup shoe units (98) and the front clamping mechanism (22) respectively engage each other as the front clamping mechanism (22) is retracted to force the backup ring assembly (44) radially inward.

The pipe clamping apparatus is moved forwards in the pipe toward the next pipe end following the retraction of the backup ring assembly (44) and the front and rear clamping mechanisms (22, 24) for welding of the next joint. The pipe clamping apparatus is moved forwards in the pipe until such time that the axial alignment mechanism (not shown) extends from the end of the pipe. The pipe clamping apparatus is then moved rearward back into the pipe such that the axial alignment mechanism (not shown) engages the end of the pipe and thereby aligns the backup ring assembly (44) with the next end to be welded. Once the pipe clamping apparatus is properly aligned, the operation as described above is repeated.

The embodiments of the invention in which an exclusive property or privilege is claimed are defined as follows:

1. An actuation system for a clamping assembly for engaging an interior surface of a pipe for use in a pipe clamping apparatus, the system comprising:
   (a) a shaft having a longitudinal axis;
   (b) an actuator defining an actuator chamber therein having a peripheral chamber wall and wherein the actuator is movably mounted about the shaft such that the shaft extends through the actuator chamber and such that the actuator is longitudinally reciprocable thereon; and
   (c) a piston fixedly mounted about the shaft and positioned within the actuator chamber, wherein the piston has a first side, a second, side and an outer perimeter sealingly engaging the peripheral chamber wall to create a first chamber adjacent the first side of the piston and a second chamber adjacent the second side of the piston such that the actuator reciprocates along the shaft in response to a differential force applied within the first chamber and the second chamber;

wherein the clamping assembly is associated with the actuator such that reciprocation of the actuator along the shaft causes the clamping assembly to move radially relative to the longitudinal axis of the shaft.

2. The actuation system as claimed in claim 1 wherein at least one of the first chamber and the second chamber is adapted to contain a pressurized fluid for providing the differential force.

3. The actuation system as claimed in claim 2 wherein the first chamber is adapted to contain a first pressurized fluid and the second chamber is adapted to contain a second pressurized fluid and wherein the first pressurized fluid and the second pressurized fluid provide the differential force for reciprocating the actuator along the shaft.

4. The actuation system as claimed in claim 2 further comprising a fluid feed mechanism associated with at least one of the first chamber and the second chamber for communicating the pressurized fluid to provide the differential force.

5. The actuation system as claimed in claim 3 further comprising a fluid feed mechanism associated with each of the first chamber and the second chamber for communicating the first pressurized fluid and the second pressurized fluid to provide the differential force.

6. The actuation system as claimed in claim 5 wherein the clamping assembly is comprised of a backup ring assembly and wherein the shaft is adapted to be fixedly mounted between a front clamping mechanism and a rear clamping mechanism in the pipe clamping apparatus.

7. The actuation system as claimed in claim 6 wherein the actuator comprises at least one camming surface and wherein the backup ring assembly is associated with the camming surface such that reciprocation of the actuator along the shaft moves the backup ring assembly along the camming surface to cause the backup ring assembly to move radially relative to the longitudinal axis of the shaft.

8. The actuation system as claimed in claim 7 wherein the camming surface is radially spaced apart from the actuator chamber.

9. The actuation system as claimed in claim 7 wherein the camming surface is longitudinally spaced apart from the actuator chamber.

10. The actuation system as claimed in claim 7 wherein the backup ring assembly is comprised of a plurality of backup shoe units.

11. The actuation system as claimed in claim 10 wherein the actuator comprises a plurality of camming surfaces and wherein the plurality of backup shoe units engage the camming surfaces so that reciprocation of the actuator along the shaft causes the backup shoe units to move radially relative to the longitudinal axis of the shaft by moving along the camming surfaces.

12. The actuation system as claimed in claim 11 wherein reciprocation of the actuator along the shaft in a first direction causes the backup shoe units to move radially outward toward an extended position for engaging the interior surface of the pipe and wherein reciprocation of the actuator along the shaft in a second direction causes the backup shoe units to move radially inward toward a retracted position.

13. The actuation system as claimed in claim 12 wherein the actuator has an outer perimeter and wherein the camming surfaces are circumferentially spaced about the outer perimeter of the actuator.

14. The actuation system as claimed in claim 13 wherein the camming surfaces are radially spaced apart from the actuator chamber.

15. The actuation system as claimed in claim 13 wherein the camming surfaces are longitudinally spaced apart from the actuator chamber.

16. The actuation system as claimed in claim 12 wherein the fluid feed mechanism selectively communicates the first pressurized fluid to the first chamber and the second pressurized fluid to the second chamber to provide the differential force to selectively cause the actuator to reciprocate along the shaft in the first and second directions.

17. The actuation system as claimed in claim 16 wherein the fluid feed mechanism is comprised of a first fluid port associated with the first chamber for communicating the first pressurized fluid to cause the actuator to reciprocate along the shaft in the first direction and a second fluid port associated with the second chamber for communicating the second pressurized fluid to cause the actuator to reciprocate along the shaft in the second direction.

18. The actuation system as claimed in claim 17 wherein the fluid feed mechanism is further comprised of a first fluid conduit for conducting the first pressurized fluid to the first fluid port and a second fluid conduit for conducting the second pressurized fluid to the second fluid port and wherein at least a portion of each of the first and second fluid conduits extends through the shaft.

19. The actuation system as claimed in claim 12 further comprising an alignment plate disposed in a plane which is substantially perpendicular to the longitudinal axis of the shaft, wherein the alignment plate is fixedly mounted about the shaft such that the shaft extends therethrough.

20. The actuation system as claimed in claim 19 wherein the alignment plate comprises a guide ring extending about a perimeter of the alignment plate in a plane substantially perpendicular to the plane of the alignment plate in a direction toward the actuator so that that the alignment plate defines an actuator housing and wherein the actuator is contained within the actuator housing.

21. The actuation system as claimed in claim 20 wherein the guide ring defines a plurality of sleeves for receiving the plurality of backup shoe units.

22. The actuation system as claimed in claim 12 wherein the backup shoe units are capable of a limited range of radial movement between an inner limit and an outer limit without reciprocation of the actuator along the shaft.

23. The actuation system as claimed in claim 22 wherein each of the backup shoe units comprises an urging mechanism for urging the backup shoe units toward the outer limit of the limited range of radial movement.

24. The actuation system as claimed in claim 22 further comprising an auxiliary mechanism for dislodging the backup ring assembly when at least one of the backup shoe units is stuck to the interior surface of the pipe in the extended position.

25. The actuation system as claimed in claim 24 wherein at least one of the front clamping mechanism and the rear clamping mechanism is capable of radial movement inward and outward relative to the longitudinal axis of the shaft and wherein the auxiliary dislodging mechanism comprises an engagement surface on at least one of the backup shoe units for engaging at least one of the front clamping mechanism and the rear clamping mechanism in response to inward radial movement of the clamping mechanism when the backup shoe unit is not in the retracted position in order to urge the backup shoe unit radially inward.

26. The actuation system as claimed in claim 24 wherein the outer limit of the limited range of radial movement of the backup shoe units varies so that reciprocation of the actuator along the shaft in the second direction causes the backup shoe units to move radially inward sequentially toward the retracted position as the backup shoe units sequentially reach the outer limit of the limited range of radial movement.

27. The actuation system as claimed in claim 26 wherein the outer limit of the limited range of radial movement of the backup shoe units is varied by inserting one or more shims in the backup shoe units to alter the outer limit.

28. The actuation system as claimed in claim 24 wherein the configuration of each of the camming surfaces varies amongst two or more of the camming surfaces so that reciprocation of the actuator along the shaft in the second direction causes the backup shoe units to move radially inward sequentially toward the retracted position as the backup shoe units sequentially reach the outer limit of the limited range of radial movement.

29. The actuation system as claimed in claim 12 wherein the backup ring assembly is actuated independently of both the front clamping mechanism and the r ear clamping mechanism.

30. The actuation system as claimed in claim 29 wherein the front clamping mechanism is capable of radial movement relative to the longitudinal axis of the shaft between an extended position and a retracted position, wherein the rear clamping mechanism is capable of radial movement relative to the longitudinal axis of the shaft between an extended position and a retracted position and wherein the front clamping mechanism and the rear clamping mechanism extend further from the longitudinal axis of the shaft than does the backup ring assembly when each of the front clamping mechanism, the rear clamping mechanism and the backup ring assembly are in the retracted position.

31. The actuation system as claimed in claim 13 wherein each camming surface comprises a camming slot, wherein each camming slot has an outermost end, and wherein the outermost end of each camming slot extends to the outer perimeter of the actuator so that the backup shoe units are removable from the backup ring assembly when the backup shoe units are in the extended position and the pipe clamping apparatus is not positioned inside a pipe.

32. The actuation system as claimed in claim 31 further comprising a releasable retainer associated with each backup shoe unit for releasably retaining the backup shoe units relative to the camming slot when the backup shoe units are in the extended position and the pipe clamping apparatus is not positioned inside the pipe.

* * * * *